US005083430A

United States Patent [19]

Hirata et al.

[11] Patent Number: 5,083,430

[45] Date of Patent: Jan. 28, 1992

[54] HYDRAULIC DRIVING APPARATUS

[75] Inventors: Toichi Hirata, Ushiku; Hideaki Tanaka, Tsuchiura; Genroku Sugiyama; Yusaku Nozawa, both of Ibaraki, all of Japan

[73] Assignee: Hitachi Construction Machinery Co., Ltd., Tokyo, Japan

[21] Appl. No.: 439,389

[22] PCT Filed: Mar. 22, 1989

[86] PCT No.: PCT/JP89/00302

§ 371 Date: Nov. 13, 1989

§ 102(e) Date: Nov. 13, 1989

[87] PCT Pub. No.: WO89/09343

PCT Pub. Date: May 10, 1989

[30] Foreign Application Priority Data

Mar. 23, 1988 [JP] Japan ................................ 63-67305

[51] Int. Cl.[5] ................................ F16D 31/02

[52] U.S. Cl. ................................ 60/445; 60/452; 91/517; 91/531; 91/444; 91/448; 137/596.14

[58] Field of Search ................................ 60/445, 452, 427; 91/517, 531, 444, 448; 137/596.14, 596.16; 251/35

[56] References Cited

U.S. PATENT DOCUMENTS 4,020,867 5/1977 Sumiyoshi .
4,129,987 12/1978 Blume ................................ 60/445
4,425,759 1/1984 Krusche ................................ 60/452 X
4,535,809 8/1985 Andersson ................................ 137/596.14
4,617,854 10/1986 Kropp ................................ 91/517
4,662,601 5/1987 Andersson ................................ 251/35
4,769,991 9/1988 Johnson ................................ 60/427 X
4,884,402 12/1989 Strenzke et al. ................................ 60/445 X
4,938,022 7/1990 Hirata et al. ................................ 91/517 X
4,945,723 8/1990 Izumi et al. ................................ 91/517 X
4,967,557 11/1990 Izumi et al. ................................ 60/452 X

FOREIGN PATENT DOCUMENTS 2906670 9/1980 Fed. Rep. of Germany .
13422165 12/1984 Fed. Rep. of Germany .
2298754 6/1975 France ................................ 251/35
0197603 11/1984 Japan .

*Primary Examiner*—Edward K. Look
*Assistant Examiner*—Todd Mattingly
*Attorney, Agent, or Firm*—Fay, Sharpe, Beall, Fagan, Minnich & McKee

[57] ABSTRACT

A hydraulic driving apparatus has at least one hydraulic pump, a plurality of hydraulic actuators driven by hydraulic fluid discharged from the hydraulic pump, a tank to which return fluid from the plurality of hydraulic actuators is discharged, and a flow control valve associated with each of the plurality of hydraulic actuators. The flow control valve has a first main variable restrictor for controlling flow rate of the hydraulic fluid supplied from the hydraulic pump to the hydraulic actuator, and a second main variable restrictor for controlling flow rate of the return fluid discharged from the hydraulic actuator to the tank. A pump control operative in response to the difference between the discharge pressure of the hydraulic pump and the maximum load pressure of the hydraulic actuators normally controls the discharge rate of the hydraulic pump so that the pump discharge pressure is raised more than the maximum load pressure by a predetermined value. A first pressure-compensating control operates with a valve determined by the difference between the pump discharge pressure and the maximum load pressure, the value acting as a compensating differential-pressure target value, and pressure-compensation-controls the first main variable restrictor of the flow control valve. A second pressure-compensating control is operative with a value determined by the pressure difference across the first main variable restrictor, the valve acting as a compensating differential-pressure target value, for controlling the second main variable restrictor of the flow control valve.

21 Claims, 9 Drawing Sheets

HYDRAULIC DRIVING APPARATUS

TECHNICAL FIELD

The present invention relates to a hydraulic driving circuit for a hydraulic machine equipped with a plurality of hydraulic actuators, such as a hydraulic excavator, a hydraulic crane or the like and, more particularly, to a hydraulic driving apparatus for controlling flow rate of hydraulic fluid supplied to a plurality of hydraulic actuators respectively by pressure-compensated flow control valves, while controlling discharge rate of a hydraulic pump in such a manner that discharge pressure of the hydraulic pump is raised more than the maximum load pressure of the hydraulic actuators by a predetermined value.

BACKGROUND ART

In recent years, in a hydraulic driving apparatus for a hydraulic machine equipped with a plurality of hydraulic actuators, such as a hydraulic excavator, a hydraulic crane or the like, a variable displacement type hydraulic pump has included a load-sensing control as disclosed in DE-A1-3422165 (corres. to JP-A-60-11706). The load sensing control controls the discharge rate of the hydraulic pump in such a manner that discharge pressure of the hydraulic pump is raised more than maximum load pressure of the plurality of hydraulic actuators by a predetermined value. In this case, pressure compensating valves are arranged respectively in meter-in circuits for the hydraulic actuators, and the flow rate of hydraulic fluid supplied to the hydraulic actuators is controlled by flow control valves equipped respectively with the pressure compensating valves. By doing so, the discharge rate of the hydraulic pump increases and decreases depending upon the requisite flow rates for the hydraulic actuators, so that economical running is made possible. In addition, by the pressure compensating valves, in sole operation, precise flow control is made possible without being influenced by load pressure of the operated actuator, while, in combined operation, smooth combined operation is made possible without being influenced by the mutual load pressures, in spite of the fact that the hydraulic actuators are connected in parallel relation to each other.

In this hydraulic driving apparatus, there is the following problem peculiar to the load sensing control.

The discharge rate of the hydraulic pump is determined by the displacement volume or, in the case of a swash plate type, by the product of an amount of inclination and rotational speed of the swash plate such that the discharge rate increases in proportion to an increase in the amount of the inclination. In this amount of inclination of the swash plate, there is a maximum amount of inclination as a limit value which is determined from the constructional point of view. The discharge rate of the hydraulic pump is maximized at the maximum amount of inclination. Further, driving of the hydraulic pump is effected by a prime mover. When input torque to the hydraulic pump exceeds output torque from the prime mover, rotational speed of the prime mover starts to decrease and, in the worst case, the prime mover reaches stall. In order to avoid this, input-torque limiting control is carried out in which a maximum value of the amount of inclination of the swash plate is so limited that the input torque to the hydraulic pump does not exceed the output torque from the prime mover, to control the discharge rate.

As described above, there is the maximum-limit discharge flow rate in the hydraulic pump. Accordingly, at the combined operation of the plurality of hydraulic actuators, when the sum of the requisite flow rates for the plurality of hydraulic actuators commanded by their respective operating levers is brought to a value higher than the maximum-limit discharge flow rate of the hydraulic pump, it is made impossible to increase the discharge rate of the hydraulic pump to the requisite flow rate by the load sensing control, so that an insufficient state of the discharge rate with respect to the requisite flow rate occurs. In the present specification, the hydraulic pump is thus said to be saturated when the hydraulic pump is saturated in this manner, a major part of the flow rate discharged from the hydraulic pump flows to the hydraulic actuator on the low pressure side, but the hydraulic fluid is not supplied to the hydraulic actuator on the high pressure side, so that smooth combined operation is made impossible.

In order to solve this problem, in the hydraulic driving apparatus disclosed in the above-mentioned DE-A1-3422165 (corres. to JP-A-60-11706), the arrangement is such that two pressure receiving sections acting respectively in the valve opening and closing directions are additionally provided to each of the pressure compensating valves, arranged in the meter-in circuits for the respective hydraulic actuators. The pump discharge pressure is introduced to the pressure receiving section acting in the valve opening direction, and the maximum load pressure of the plurality of actuators is introduced to the pressure receiving section acting in the valve closing direction. With this arrangement, when the sum of the respective requisite flow rates for the plurality of hydraulic actuators commanded by their respective operating levers is brought to a value higher than the maximum-limit discharge flow rate of the hydraulic pump, the pressure compensating valve for the actuator on the low pressure side is restricted in response to a drop of the differential pressure between the discharge pressure of the hydraulic pump and the maximum load pressure. Thus, the flow rate flowing through the actuator on the low pressure side is restricted and, therefore, it is ensured that the hydraulic fluid is supplied also to the hydraulic actuator on the high pressure side. As a result, the discharge flow rate of the hydraulic pump is divided to the plurality of actuators, so that the combined operation is made possible.

Furthermore, DE-A1-2906670 discloses a hydraulic driving apparatus in which pressure compensating valves different in operation principle from the general pressure compensating valves described above are incorporated respectively in a meter-in circuit and a meter-out circuit for flow control valves. The function of the pressure compensating valve incorporated in the meter-in circuit is substantially the same as that disclosed in DE-A1-3422165. That is, the pressure compensating valve usually makes possible smooth combined operation and flow-rate control not influenced by load pressure. On the other hand, when the hydraulic pump is saturated, the pressure compensating valve senses the saturation, to restrict the pressure compensating valve in the meter-in circuit for the actuator on the low pressure side, thereby making it possible also to supply the hydraulic fluid to the actuator on the high pressure side. Moreover, the pressure compensating valve incorporated in the meter-out circuit functions in the following manner.

When a hydraulic cylinder is driven by hydraulic fluid supplied from the meter-in circuit, the driving speed of the hydraulic cylinder is controlled by flow-rate control in the meter-in circuit. In contradistinction thereto, when a negative load such as an inertial load or the like acts upon the hydraulic cylinder, the hydraulic actuator is forcedly driven so that the pressure of the return fluid from the hydraulic cylinder tends to increase. In this case, for the arrangement provided with no pressure compensating valve in the meter-out circuit, disclosed in DE-A1-3422165 or the like, it is impossible to pressure-compensation-control the flow rate passing through the flow control valve in the meter-out circuit so that the flow rate of the return fluid increases. As a result, a balance in ration is lost between the flow rate of the hydraulic fluid supplied to the hydraulic cylinder and the flow rate of the return fluid discharged from the hydraulic cylinder, so that cavitation occurs in the meter-in circuit. In DE-A1-2906670, the pressure compensating valve is incorporated also in the meter-out circuit, whereby, when the negative load acts upon the hydraulic cylinder, the flow rate passing through the flow control valve is pressure-compensation-controlled with respect to pressure fluctuation in the meter-out circuit, thereby preventing an increase in the flow rate of the return fluid discharged from the hydraulic cylinder to prevent occurrence of cavitation in the meter-in circuit.

In DE-A1-2906670, however, the pressure compensating valve incorporated in the meter-out circuit is not so arranged as to sense saturation of the hydraulic pump. Therefore, there arises the following problem.

When the hydraulic pump is saturated, that is, when the discharge flow rate of the hydraulic pump reaches a maximum-limit flow rate so that the discharge flow rate falls into an insufficient state, the pressure compensating valve for the actuator on the low pressure side is restricted in the meter-in circuit as described previously, to divide the discharge flow rate of the hydraulic pump to the plurality of hydraulic actuators. At this time, however, it is needless to say that the flow rate supplied to each actuator is decreased more than that prior to the saturation. Under the circumstances, if negative load acts upon the hydraulic actuators, the pressure compensating valve in the meter-out circuit attempts to pressure-compensation-control the flow rate passing through the flow control valve in a manner like that prior to the saturation. For this reason, the flow rate of the return fluid from the hydraulic actuators attempts to be brought to a flow rate identical with that prior to the saturation. Thus, the balance in ratio is lost between the hydraulic fluid supplied to the hydraulic cylinder and the flow rate of the return fluid discharged from the hydraulic cylinder, so that cavitation occurs in the meter-in circuit.

It is an object of the invention to provide a hydraulic driving apparatus capable of preventing occurrence of cavitation in either case prior to saturation of a hydraulic pump and during saturation thereof, so that stable operation can be effected.

DISCLOSURE OF THE INVENTION

In order to achieve the above object, a hydraulic driving apparatus comprises at least one hydraulic pump, a plurality of hydraulic actuators driven by hydraulic fluid discharged from said hydraulic pump, a tank to which return fluid from said plurality of hydraulic actuators is discharged, and flow control valve means associated with each of said plurality of hydraulic actuators, the flow control valve means having first main variable restrictor means for controlling the flow rate of the hydraulic fluid supplied from said hydraulic pump to the hydraulic actuator, and second main variable restrictor means for controlling the flow rate of the return fluid discharged from the hydraulic actuator to said tank. Pump control means are operative in response to the differential pressure between the discharge pressure of said hydraulic pump and the maximum load pressure of said plurality of hydraulic actuators, and normally control the discharge rate of said hydraulic pump in such a manner that the pump discharge pressure is raised more than the maximum load pressure by a predetermined value. First pressure-compensating control means operative with a value determined by the differential pressure between said pump discharge pressure and the maximum load pressure as a compensating differential-pressure target value, pressure-compensation-control the first main variable restrictor means of said flow control valve means, wherein second pressure-compensating control means are provided which are operative with a value determined by differential pressure across said first main variable restrictor means acting as a compensating differential-pressure target value, for controlling the second main variable restrictor means of said flow control valve means.

With the invention constructed as above, by load sensing control by the pump control means controlling the pump discharge rate in such a manner that the pump discharge pressure is increased more than the maximum load pressure by the predetermined value, the differential pressure between the pump discharge pressure and the maximum load pressure is maintained at said predetermined value normally, that is, prior to saturation of the hydraulic pump, while, after the saturation, the pump discharge flow rate falls into an insufficient state so that the differential pressure also decreases in accordance with the insufficient flow rate. For this reason, the first pressure compensating control means is operative with a value determined by the differential pressure as the compensating differential pressure target value, to pressure-compensatingly-control the first main variable restrictor means of the flow control valve means. By doing so, prior to saturation of the hydraulic pump, a fixed value can be set as the compensating differential-pressure target value, while, after the saturation, a value that depends upon the insufficient flow rate of the pump discharge rate can be set as the compensating differential-pressure target value.

With the arrangement, prior to the saturation of the hydraulic pump, the first main variable restrictor means are pressure-compensatingly-controlled with the fixed value as a common compensating differential-pressure target value, so that, in the sole operation of each hydraulic actuator, usual pressure compensating control can be effected, while in the combined operation of the hydraulic actuators, it is possible to prevent a major part of the hydraulic fluid from flowing into the lower pressure side, so that smooth combined operation can be effected. On the other hand, after the saturation, the first main variable restrictor means are pressure-compensatingly-controlled with a value decreased in accordance with the insufficient flow rate of the pump discharge rate as a common compensating differential-pressure target value. Accordingly, it is ensured that, in the combined operation of the hydraulic actuators, the hydraulic fluid can be distributed to the plurality of actuators, so that smooth combined operation can likewise be effected.

Furthermore, the arrangement is such that the second pressure compensating control means is operative with a value determined by the differential pressure across the first main variable restrictor means, pressure-compensatingly-controlled in the manner described above, being a compensating differential pressure target value, to control the second main variable restrictor means of the flow control valve means. With such an arrangement, regardless of the operation prior to the saturation of the hydraulic pump and after the saturation, the flow rate through the second main variable restrictor means is so controlled as to be brought to a fixed relationship with respect to the flow rate through the first main variable restrictor means. For this reason, in either case prior to the saturation of the hydraulic pump or after the saturation, when a negative load such as an inertial load or the like acts upon the hydraulic actuator, the flow rate of the return fluid flowing through the second main variable restrictor means can be brought into coincidence with the flow rate discharged under driving of the hydraulic actuator by the first main variable restrictor means. Thus, it is possible to control the pressure in the meter-out circuit in a stable manner, and to prevent occurrence of cavitation in the meter-in circuit.

BEST MODE FOR CARRYING OUT THE INVENTION

Preferred embodiment of the invention will be described below with reference to the drawings.

FIRST EMBODIMENT

A hydraulic driving apparatus according to a first embodiment of the invention will first be described with reference to FIG. 1.

CONSTRUCTION

Figure 1:
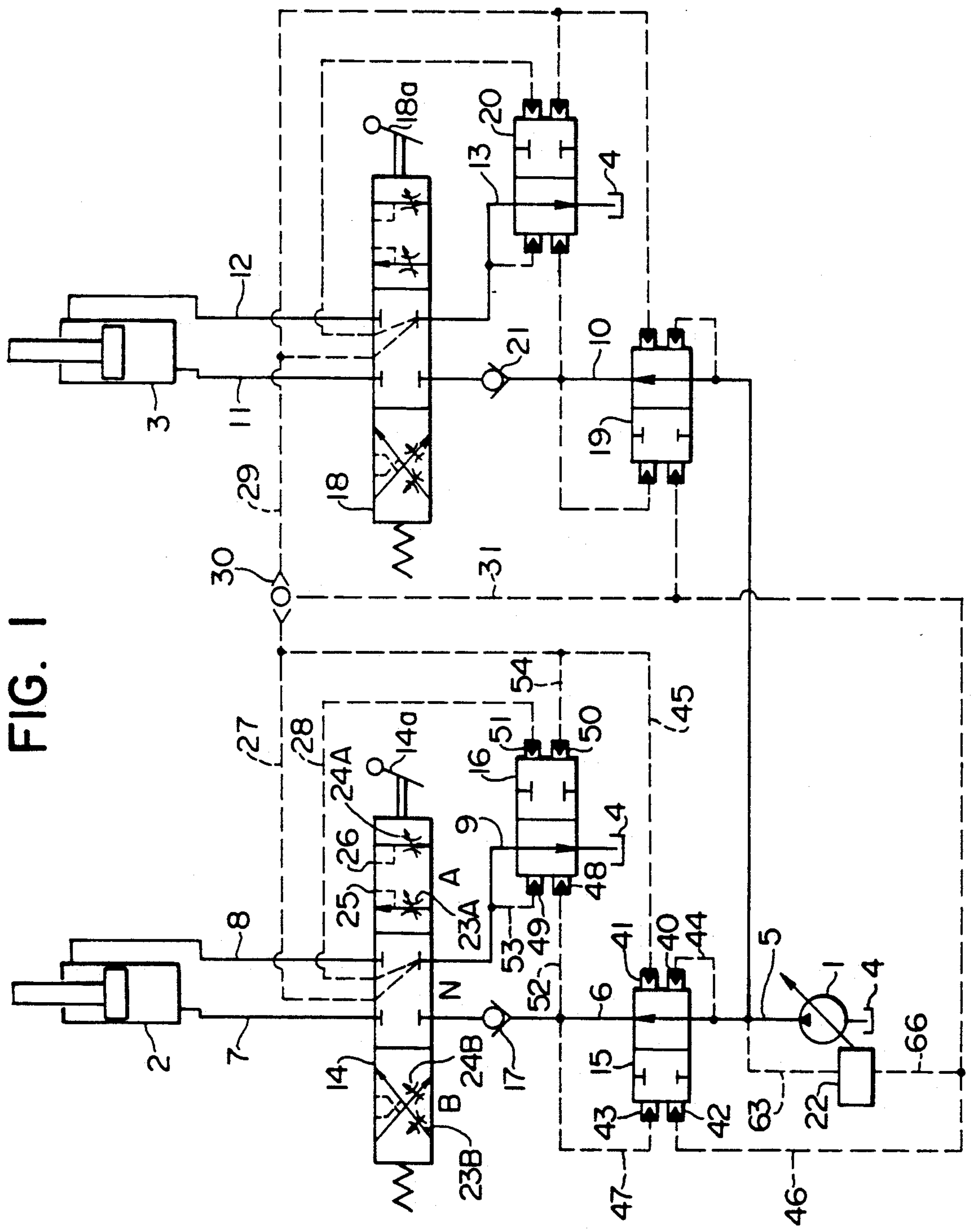
FIG. 1 is a circuit diagram of a hydraulic driving apparatus according to a first embodiment of the invention.

In FIG. 1, a hydraulic driving apparatus according to the embodiment comprises a variable displacement hydraulic pump 1 of, for example, swash plate type, first and second hydraulic actuators 2, 3 driven by hydraulic fluid from the hydraulic pump 1, a tank 4 to which return fluid from the hydraulic actuators 2, 3 is discharged, main lines 5, 6 serving as a hydraulic-fluid supply line, main lines 7, 8 serving as an actuator line and a main line 9 serving as a return line, which constitute a main circuit for the hydraulic actuator 2, similar main lines 10~13 constituting a main circuit for the hydraulic actuator 3, a first flow control valve 14 arranged between the main lines 6, 9 and the main lines 7, 8 in the main circuit for the hydraulic actuator 2 and pressure-compensating auxiliary valves 15, 16 for the flow control valve 14 arranged respectively in the main lines 6, 9, a check valve 17 arranged in the main line 6 at a location between the auxiliary valve 15 and the flow control valve 14, a similar second flow control valve 18, pressure-compensating auxiliary valves 19, 20 for the flow control valve 18 and a check valve 21 arranged in the main circuit for the hydraulic actuator 3, and a pump regulator 22 for controlling the discharge rate of the hydraulic pump 1.

The first flow control valve 14 has a neutral position N and two switching positions A, B on the left- and right-hand sides as view in the figure. When the first flow control valve 14 is switched to the right-hand position A, the main lines 6, 9 are brought into communication respectively with the main lines 7, 8, to cause a first main variable restrictor section 23A and a second main variable restrictor section 24A to respectively control the flow rate of the hydraulic fluid supplied from the hydraulic pump 1 to the hydraulic actuator 2 and the flow rate of the return fluid discharged from the hydraulic actuator 2 to the tank 4. On the other hand, when the first flow control valve 14 is switched to the left-hand position B, the main lines 6, 9 are brought into communication respectively with the main lines 8, 7, to cause a first main variable restrictor section 23B and a second main variable restrictor section 24B to respectively control the flow rate of the hydraulic fluid supplied from the hydraulic pump 1 to the hydraulic actuator 2 and the flow rate of the return fluid discharged from the hydraulic actuator 2 to the tank 4. That is, when the flow control valve 14 is in the right-hand position A, the main lines 6, 7 and the first main variable restrictor section 23A cooperate with each other to form a meter-in circuit, while the main lines 8, 9 and the second main variable restrictor section 24A cooperate with each other to form a meter-out circuit. On the other hand, when the flow control valve 14 is in the left-hand position B, the main lines 6, 8 and the first main variable restrictor section 23B cooperate with each other to form a meter-in circuit, while the main lines 7, 9 and the second main variable restrictor section 24B cooperate with each other to form a meter-out circuit.

Further, the flow control valve 14 is provided with a load port 25 communicating with downstream sides of the respective first main variable restrictor sections 23A, 23B in the switching positions A and B, for detecting load pressure on the side of the meter-in circuit for the hydraulic actuator 2, and a load port 26 communicating with upstream sides of the respective second main variable restrictor sections 24A, 24B in the switching positions A and B, for detecting load pressure on the side of the meter-out circuit for the hydraulic actuator 2. Load lines 17, 28 are connected respectively to the load ports 25, 26.

The second flow control valve 18 is likewise constructed. In connection with the second flow control valve 18, only a load line, which detects load pressure on the side of the meter-in circuit for the hydraulic actuator 3, is designated by the reference numeral 29.

The load lines 27, 29 are connected to a shuttle valve 30 in such a manner that load pressure on the higher pressure side of the load lines 27, 29 is detected by the shuttle valve 30 and is taken out to a maximum load line 31.

The pressure-compensating auxiliary valve 15 has two pressure receiving sections 40, 41 biasing the auxiliary valve 15 in a valve opening direction, and two pressure receiving sections 42, 43 biasing the auxiliary valve 15 in a valve closing direction. The discharge pressure of the hydraulic pump 1 is introduced to one of the pressure receiving sections 40 biasing in the valve opening direction through a hydraulic line 44, while the load pressure of the meter-in circuit for the hydraulic actuator 2, that is, outlet pressure of the flow control valve 14 in the meter-in circuit is introduced to the other pressure receiving section 41 through a hydraulic line 45. On the other hand, maximum load pressure is introduced to one of the pressure receiving sections 42 biasing in the valve closing direction through a hydraulic line 46, while inlet pressure of the flow control valve 14 in the meter-in circuit is introduced to the other pressure receiving section 43 through a hydraulic line 47. The pressure receiving sections 40∼43 are all set to have their respective pressure receiving areas identical with each other.

Likewise, the pressure-compensating auxiliary valve 16 has two pressure receiving sections 48, 49 biasing the auxiliary valve 16 in a valve opening direction, and two pressure receiving sections 50, 51 biasing the auxiliary valve 16 in a valve closing direction. The inlet pressure of the flow control valve 14 in the meter-in circuit for the hydraulic actuator 2 is introduced to one of the pressure receiving sections 48 biasing in the valve opening direction through a hydraulic line 52, while the outlet pressure of the flow control valve 14 in the meter-out circuit is introduced to the other pressure receiving section 49 through a hydraulic line 53. Further, the outlet pressure of the flow control valve 14 in the meter-in circuit is introduced to one of the pressure receiving sections 50 operating in the closing direction through a hydraulic line 54, while the inlet pressure of the flow control valve 14 in the meter-out circuit is introduced to the other pressure receiving section 51 through the hydraulic line 28. The pressure receiving sections 48∼51 are all set to have their respective pressure receiving areas identical with each other.

The pressure-regulating auxiliary valves 19, 20 on the side of the second hydraulic actuator 3 are likewise constructed.

Figure 2:
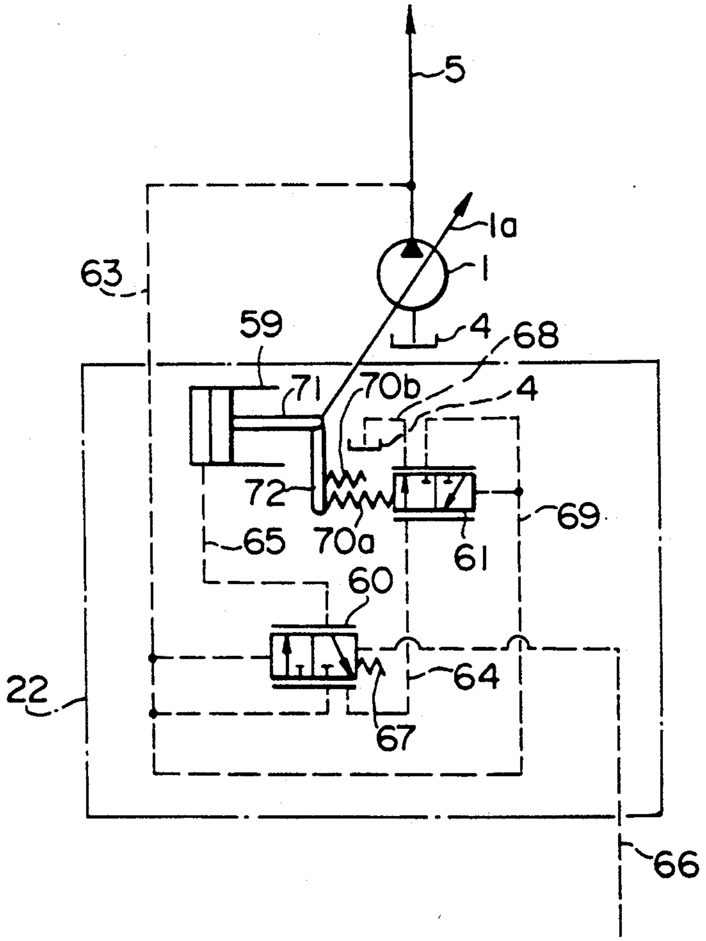
FIG. 2 is a circuit diagram showing the details of a pump regulator of the hydraulic driving apparatus.

The pump regulator 22 controls a displacement volume of the hydraulic pump 1, that is, an angle of inclination of the swash plate thereof in such a manner that the discharge pressure of the hydraulic pump 1 is raised more than the maximum load pressure by a predetermined value in response to differential pressure between the pump discharge pressure and the load pressure on the high pressure side of the first and second hydraulic actuators 2, 3, that is, the maximum load pressure. Further, the pump regulator 22 restricts the angle of inclination of the swash plate of the hydraulic pump 1 in such a manner that input torque to the hydraulic pump 1 does not exceed a predetermined limit value. As an example, the pump regulator 22 is constructed as shown in FIG. 2.

Specifically, the pump regulator 22 comprises a servo cylinder 59 for driving the swash plate 1*a* of the hydraulic pump 1, a first control valve 60 for load-sensing-controlling operation of the servo cylinder 59, and a second control valve 61 for restricting the input torque. The first control valve 60 is constituted as a servo valve arranged between a hydraulic line 63 connected to the discharge line 5 for the hydraulic pump 1 and a hydraulic line 64 connected to the second control valve 61, and a hydraulic line 65 connected to the serve cylinder 60. The pump discharge pressure introduced through the hydraulic line 63 acts upon one end of the servo valve, while a spring 67 and the maximum load pressure introduced through a load line 66 act upon the other end of the servo valve. The second control valve 61 is constituted as a servo valve arranged between the aforesaid hydraulic line 64, and a hydraulic line 68 leading to the tank 4 and a hydraulic line 69 connected to the hydraulic line 63. Forces of respective springs 70*a*, 70*b* act, in a stepwise manner, upon one end of the servo valve, while the discharge pressure of the hydraulic pump 1 introduced through the hydraulic line 69 acts upon the other end of the servo valve. The springs 70*a*, 70*b* are engaged with a control rod 72 united with a piston rod 71 of the servo cylinder 59, to enable an initial setting value to be varied depending upon the position of the piston rod 71, that is, the angle of inclination of the swash plate 1*a*.

OPERATION

The operation of the embodiment constructed as above will next be described. The respective operations of the pump regulator 22 and the pressure-compensating auxiliary valves 15, 16 will first be described in the order mentioned above.

PUMP REGULATOR 22

First, the construction of the pump regulator 22 illustrated in FIG. 2 is known. Accordingly, only the outline of the operation of the pump regulator 22 will be described here.

In a state in which operating levers 14*a*, 18*a* of the respective flow control valves 14, 18 are not operated so that no load pressure is generated in the maximum load line 66, the swash plate 1*a* of the hydraulic pump 1 is retained at its minimum angle of inclination corresponding to a maximum extending position of the servo cylinder, by the discharge pressure of the hydraulic pump 1, so that the pump discharge rate is also retained at minimum.

When the operating lever 14*a* and/or 18*a* of the flow control valve 14 and/or 18 is operated so that the load pressure (maximum load pressure) is detected at the maximum load pressure line 66, the first control valve 66 is operated on the basis of the balance between the differential pressure (hereinafter suitably referred to as "LS differential pressure") between the pump discharge pressure and the maximum load pressure, and the force of the spring 67, during a period for which the second control valve 61 is in the illustrated position, so that the position of the servo cylinder 59 is adjusted. Thus, the angle of inclination of the swash plate of the hydraulic pump 1 is so controlled that the LS differential pressure coincides with a value set by the spring 67. That is, the load sensing control is effected in such a manner that the discharge pressure from the hydraulic pump 1 is retainer higher than the maximum load pressure by the setting value of the spring 67.

When the springs 70*a*, 70*b* are extended in response to contraction of the servo cylinder 59 so that their respective initial setting values decrease whereby the second control valve 61 is operated, the pressure in the line 64 is raised more than the tank pressure, and the lower limit of the contracting position of the servo cylinder 59, that is, the maximum value of the angle of inclination of the swash plate is restricted in response to the rise in the pressure. Thus, the input torque to the hydraulic pump 1 is restricted, and horse-power limit control is effected with respect to a prime mover (not shown) for driving the hydraulic pump 1. An input-torque limit control characteristic at this time is determined depending upon the setting values of the respective springs 70*a*, 70*b*. In this manner, during the period for which the hydraulic pump 1 is input-torque-limit-controlled, the pump discharge rate is in an insufficient state with respect to the requisite flow rate. The LS differential pressure at this time is brought to a value lower than the setting value of the spring 67. That is, the hydraulic pump 1 is saturated, and the LS differential pressure is reduced to a value in accordance with the level of the saturation.

PRESSURE-COMPENSATING AUXILIARY VALVES 15, 19

In the pressure-compensating auxiliary valve 15, the pump discharge pressure and the maximum load pressure are introduced respectively to the pressure receiving sections 40, 42, while the inlet pressure and the outlet pressure (<inlet pressure) of the flow control valve 14 in the meter-in circuit are introduced respectively to the pressure receiving sections 43, 41. For this reason, the auxiliary valve 15 is biased in the valve opening direction by the differential pressure between the pump discharge pressure and the maximum load pressure introduced respectively to the pressure receiving sections 40, 42, and is biased in the valve closing direction by the differential pressure between the inlet pressure and the outlet pressure of the flow control valve 14 in the motor-in circuit introduced respectively to the pressure receiving sections 43, 41, that is, by the differential pressure (hereinafter suitably referred to as "VI differential pressure") across the flow control valve in the meter-in circuit, so that the auxiliary valve 15 is operated on the basis of the balance between the LS differential pressure and the VI differential pressure. That is, the auxiliary valve 15 is adjusted in its opening degree so as to control the VI differential pressure, with the LS differential pressure as a compensating differential-pressure target value. As a result, the auxiliary valve is pressure-compensatingly-controls the flow control valve 14 in the meter-in circuit, that is, the first variable restrictor sections 23A, 23B of the flow control valve 14 in such a manner that the VI differential pressure substantially coincides with the LS differential pressure.

It is to be noted here that the LS differential pressure is constant before the hydraulic pump 1 is saturated, as described previously. Accordingly, the compensating differential-pressure target value of the auxiliary valve 15 is also made constant correspondingly to the LS differential pressure. Thus, the first variable restrictor sections 23A, 23B are pressure-compensatingly-controlled in such a manner that the VI differential pressure is made constant.

Further, when the hydraulic pump 1 is saturated, the LS differential pressure is brought to a smaller value decreased in accordance with the level of the saturation, as described previously. Accordingly, the compensating differential-pressure target value of the auxiliary valve 15 likewise decreases, so that the first variable restrictor sections 23A, 23B are pressure-compensatingly-controlled such that the VI differential pressure substantially coincides with the decreased LS differential pressure.

The operation of the auxiliary valve 19 is the same as that of the auxiliary valve 15.

PRESSURE-COMPENSATING AUXILIARY VALVES 16, 20

In the pressure-compensating auxiliary valve 16, the inlet pressure and the outlet pressure (<inlet pressure) of the flow control valve 14 in the meter-in circuit are introduced respectively to the pressure receiving sections 48, 50, while the outlet pressure and the inlet pressure (>outlet pressure) of the flow control valve 14 in the meter-out circuit are introduced respectively to the pressure receiving sections 49, 51. For this reason, the auxiliary valve 16 is biased in the valve opening direction by the differential pressure across the flow control valve 14 in the meter-in circuit, introduced to the pressure receiving sections 48, 50, that is, by the VI differential pressure. The auxiliary valve 16 is further biased in the valve closing direction by the differential pressure between the inlet pressure and the outlet pressure of the flow control valve 14 in the meter-out circuit, introduced to the pressure receiving sections 51, 49, that is, by the differential pressure (hereinafter suitably referred to as "VO differential pressure") across the flow control valve in the meter-out circuit, so that the auxiliary valve 16 is operated on the basis of the balance between the VI differential pressure and the VO differential pressure. That is, the auxiliary valve 16 is adjusted in its opening degree so as to control the VO differential pressure, with the VI differential pressure as a compensating differential-pressure target value. As a result, the auxiliary valve 16 pressure-compensation-controls the flow control valve 14 in the meter-out circuit, that is, the second variable restrictor sections 24A, 24B of the flow control valve 14 in such a manner that the VO differential pressure coincides with the VI differential pressure.

In the manner described above, as a result of that the VO differential pressure of the flow control valve 14 being controlled to coincide with the VI differential pressure, the flow rate passing through the flow control valve 14 in the meter-out circuit (flow rate passing through the second variable restrictor sections 24A, 24B) is so controlled as to be brought to a fixed relationship with respect to the flow rate passing through the flow control valve 14 in the meter-in circuit (flow rate passing through the first variable restrictor section 23A, 23B). Further, as a result of the control with the VI differential pressure as the compensating differential-pressure target value, the fixed relationship is maintained even if the VI differential pressure varies as described previously prior to the saturation of the hydraulic pump 1 and after the saturation.

The operation of the auxiliary valve 20 is the same as that of the auxiliary valve 16.

OPERATION AS ENTIRE SYSTEM

The operation of the entire hydraulic driving apparatus based on the pump regulator 22 and the pressure-compensating auxiliary valves 15, 16 and 19, 20, which are operated in the manner described above, will next be described.

In the sole operation of the hydraulic actuator 2 or 3, the VI differential pressure of the flow control valve 14 or 18 in the meter-in circuit is so controlled as to coincide with the LS differential pressure by the previously mentioned operation of the auxiliary valve 15 or 19. At this time, there are many cases where the discharge rate of the hydraulic pump 1 is enough sufficiently, and the hydraulic pump 1 is load-sensing-controlled such that the LS differential pressure is made constant, without being saturated. For this reason, the VI differential pressure is also controlled constant so that, even if the load pressure in the meter-in circuit for the hydraulic actuator 2 or 3 fluctuates, the flow rate passing through the first variable restrictor sections 23A, 23B is controlled to a value in accordance with the amount of operation (requisite flow rate) of the operating lever 14a or 18a. Thus, precise flow-rate control is made possible which is not influenced by fluctuation in the load pressure.

Further, in the combined operation in which the hydraulic actuators 2, 3 are driven simultaneously, the above-described operation is carried out in the individual auxiliary valves 15, 19 before the hydraulic pump 1 is saturated, so that the VI differential pressure at the flow control valve 14 and the VI differential pressure at the flow control valve 18 are so controlled as to be brought into coincidence with the constant LS differential pressure. For this reason, in spite of the fact that the hydraulic actuators 2, 3 are connected in parallel relation to each other, it is possible to effect smooth combined operation without the hydraulic fluid flowing preferentially into the actuator on the low pressure side.

When the hydraulic pump 1 is input-torque-limit-controlled and is saturated upon the combined operation of the hydraulic actuators 2, 3, the LS differential pressure decreased in accordance with the level of the saturation. Also in this case, however, the auxiliary valves 15, 19 pressure-compensatingly-control the VI differential pressure of the flow control valve 14 and the VI differential pressure of the flow control valve 18, with the decreased LS differential pressure as the compensating differential-pressure target value. Accordingly, the auxiliary valve 14 or 18 corresponding to the actuator on the low pressure side is restricted, so that both the VI differential pressures of the respective flow control valves 14, 18 are so controlled as to be brought into coincidence with the decreased LS differential pressure. For this reason, the discharge flow rate is distributed in accordance with the requisite flow rates even in a state in which the pump discharge flow rate is insufficient. Thus, it is ensured that the hydraulic fluid is supplied to the actuator on the higher pressure side, so that smooth combined operation is made possible.

Further, when a negative load such as an inertia load or the like acts upon the hydraulic actuator 2 or 3, regardless of the sole operation and the combined operation of the hydraulic actuators 2, 3, the hydraulic fluid in the hydraulic actuator, on the side of the meter-out circuit is not discharged under driving of the hydraulic actuator due to the flow control in the meter-in circuit, but tends to be forcedly discharged by the negative load. In this case, prior to saturation of the hydraulic pump 1, the flow rate passing through the flow control valves 14, 18 in the meter-out circuit is so controlled as to be brought to a fixed relationship with respect to the flow rate passing through the flow control valves 14, 18 in the meter-in circuit, by the previously mentioned operation of the auxiliary valves 16, 20 for the meter-out circuit. As a result, the flow rate of the return fluid flowing through the meter-out circuit can be brought into coincidence with the flow rate discharged by driving of the hydraulic actuator due to the flow control in the meter-in circuit, so that the pressure in the meter-out circuit can be controlled in a stable manner. In addition, it is possible to prevent occurrence of cavitation in the meter-in circuit due to breakage of the balance between the flow rate of the hydraulic fluid supplied to the hydraulic actuator and the flow rate of the hydraulic fluid discharged from the hydraulic actuator.

Furthermore, also in the case where a negative load acts after saturation of the hydraulic pump 1, the auxiliary valves 16, 20 with the VI differential pressure as the compensating differential-pressure target value likewise control the flow control valves 14, 18 such that the flow rate of the return fluid flowing through the meter-out circuit coincides with the flow rate discharged by driving of the hydraulic actuator due to the flow-rate control in the meter-in circuit. Thus, it is possible to control the pressure in the meter-out circuit in a stable manner, and it is possible to prevent occurrence of cavitation in the meter-in circuit.

As described above, according to the embodiment, even if the hydraulic pump 1 is saturated during the combined operation of the hydraulic actuators 2, 3, it is ensured that the discharge flow rate is distributed to the hydraulic actuators 2, 3 under the action of the pressure-compensating auxiliary valves 15, 19, so that smooth combined operation is made possible. In addition, regardless of the states prior to saturation of the hydraulic pump 1 and after saturation, the discharge flow rate in the meter-out circuit is pressure-compensation-controlled when a negative load acts upon the hydraulic actuators. Thus, pressure fluctuation in the meter-out circuit can be reduced, and it is possible to prevent occurrence of cavitation in the meter-in circuit.

SECOND EMBODIMENT

A second embodiment of the invention will be described with reference to FIG. 3. In the figure, the component parts the same as those illustrated in FIG. 1 are designated by the same reference numerals. The embodiment differs from the embodiment in that the LS differential pressure, not the VI differential pressure, acts upon the pressure-compensating auxiliary valve on the side of the meter-out circuit.

Figure 3:
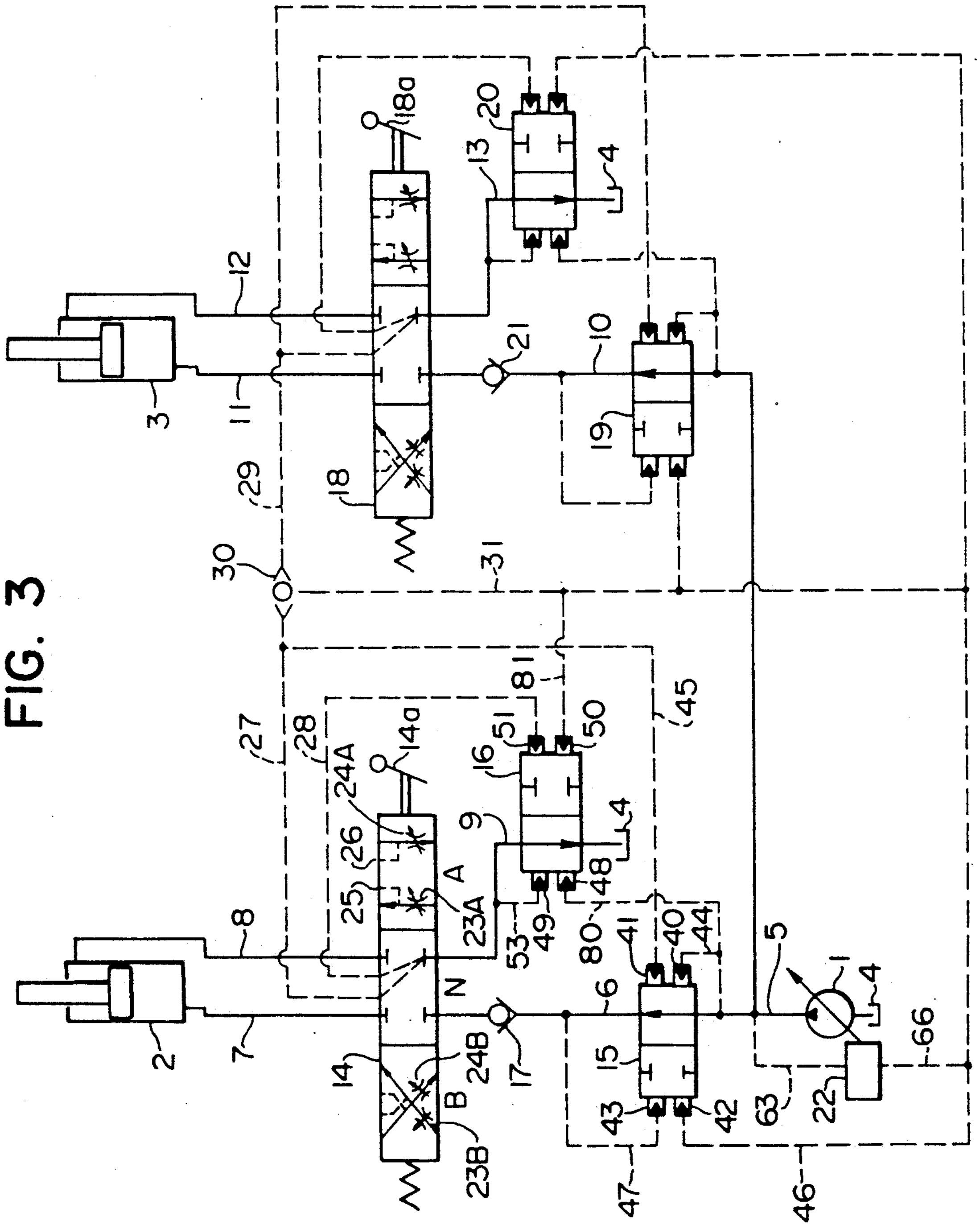
FIG. 3 is a circuit diagram of a hydraulic driving apparatus according to a second embodiment of the invention.

Specifically, in FIG. 3, the arrangement is such that discharge pressure from the hydraulic pump 1 and the maximum load pressure detected at the load line 31 are introduced respectively into the pressure receiving chambers 48, 50 of the pressure-compensating auxiliary valve 16 through hydraulic lines 80, 81, and that the auxiliary valve 16 is biased in the valve opening direction by differential pressure between the pump discharge pressure and the maximum load pressure, that is, the LS differential pressure. The pressure-compensating auxiliary valve 20 is likewise arranged.

The auxiliary valves 16, 20 constructed as above are operated on the basis of the balance between the LS differential pressure in substitution for the VI differential pressure, and the VO differential pressure, to control the VO differential pressure with the LS differential pressure as a compensating differential-pressure target value. The reason why the VI differential pressure is brought to the compensating differential-pressure target value in the first embodiment is that, regardless of the states prior to saturation of the hydraulic pump 1 and after saturation, the flow rate passing through the flow control valve 14 in the meter-out circuit (flow rate passing through the second variable restrictor sections 24A, 24B) is controlled in a fixed relationship with respect to the flow rate passing through the flow control valve in the meter-in circuit (flow rate passing through the first variable restrictor section (23A, 23B). It is to be noted here that the VI differential pressure is pressure-compensatingly-controlled by the pressure compensating valves 15, 19 in the meter-in circuit, with the LS differential pressure as the compensating differential-pressure target value. Accordingly, a similar result can be obtained even if the LS differential pressure is substituted for the VI differential pressure. That is, like the first embodiment, regardless of the states prior to saturation of the hydraulic pump 1 and after saturation, pressure fluctuation in the meter-out circuit is reduced when a negative load acts upon the hydraulic actuator, and it is possible to prevent occurrence of cavitation in the meter-in circuit.

In connection with the present embodiment, the resultant arrangement is such that the LS differential pressure acts upon both the auxiliary valves 15, 19 on the side of the meter-in circuit and the auxiliary valves 16, 20 on the side of the meter-out circuit. In such case, a common differential-pressure meter for detecting the LS differential pressure is arranged, and a detecting signal from the differential-pressure meter can be used for causing the LS differential pressure to act, without individual introduction of the pump discharge pressure and the maximum load pressure. For instance, an electromagnetic proportional valve for converting a detecting signal from the differential-pressure meter into a hydraulic signal is arranged, while each auxiliary valve is provided as usual with a spring acting in the valve opening direction and, in addition, with a pressure receiving section acting in the valve closing direction, and a hydraulic signal from the electromagnetic proportional valve is applied to the pressure receiving section. In this case, a single valve may be used in common as the electromagnetic proportional valve. It is preferable, however, that electromagnetic proportional valves different in gain from each other are arranged respectively with respect to the hydraulic actuators 2, 3, the detecting signals from the differential-pressure meter are converted respectively into hydraulic signals of levels suited for the working characteristics in the combined operation of the respective actuators, and the hydraulic signals are applied respectively to the pressure receiving sections. By doing so, pressure compensating characteristics suitable respectively to the actuators in the combined operation of the hydraulic actuators 2,3 are set, making it possible to improve the combined operability. This is likewise applicable tot he auxiliary valve on the side of the meter-in circuit upon which the LS differential pressure acts, in the previously described first embodiment and embodiments to be described later.

THIRD EMBODIMENT

A third embodiment of the invention will be described with reference to FIGS. 4 through 6. In the figures, the same component parts as those illustrated in FIG. 1 are designated by the same reference numerals. The previously mentioned embodiments are examples in which usual spool-type flow control valves 14, 18 are employed as flow control valves. However, the present embodiment is such that each of the flow control valves is constructed by the use of four seat valve assemblies.

CONSTRUCTION

Figure 4:
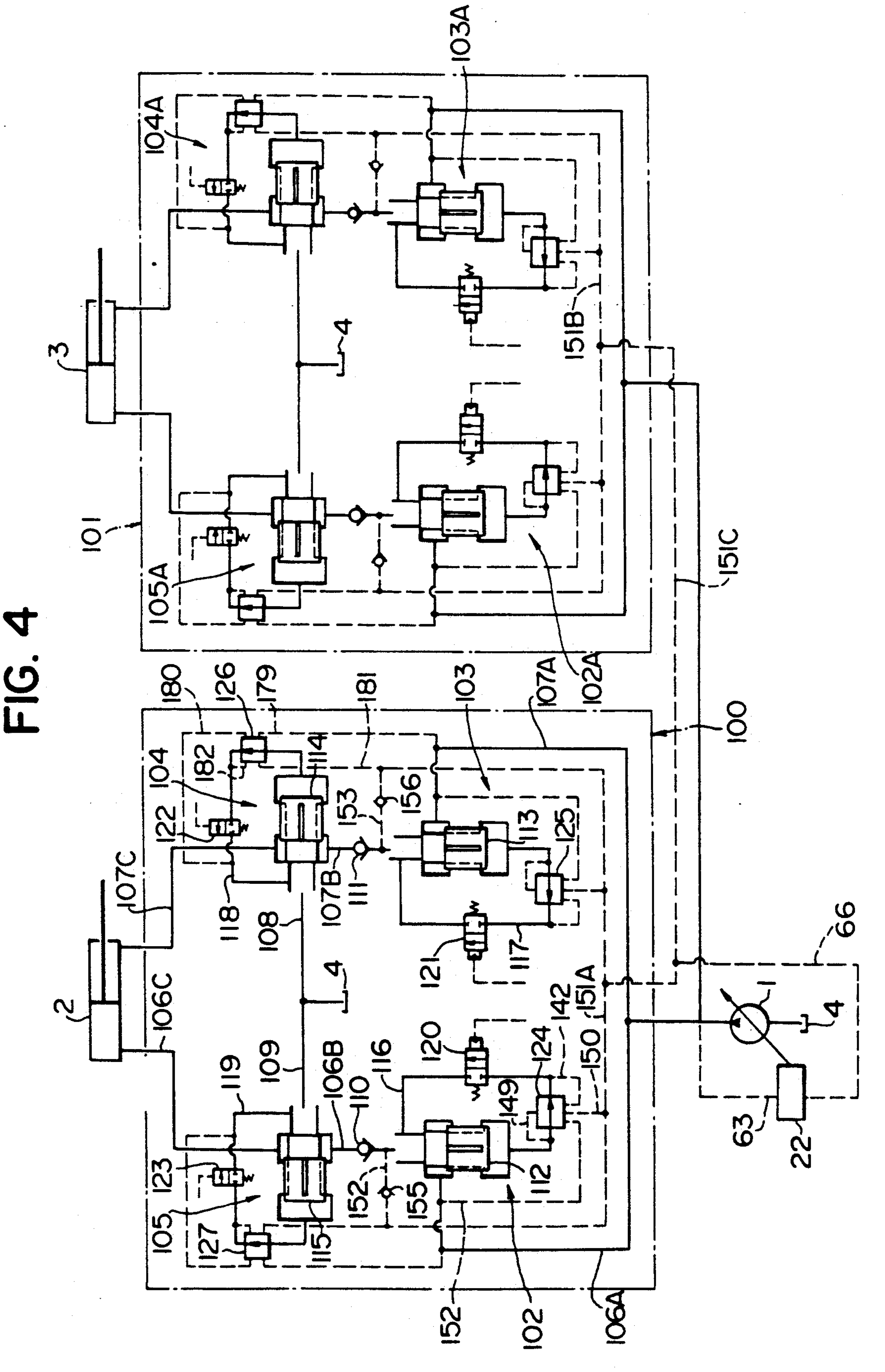
FIG. 4 is a circuit diagram of a hydraulic driving apparatus according to a third embodiment of the invention.

IN FIG. 4, first and second flow control valves 100, 101 are arranged between the hydraulic pump 1 and the hydraulic actuators 2, 3, corresponding respectively to the hydraulic actuators 2, 3. The flow control valves 100, 101 are composed respectively of first through fourth seat valve assemblies 102∼105, 102A∼105A.

In the first flow control valve 100, the first seat valve assembly 102 is arranged in a meter-in circuit 106A∼106C at the time the hydraulic actuator is so driven as to extend. The second seat valve assembly 103 is arranged in a meter-in circuit 107A∼107C at the time the hydraulic actuator 2 is so driven as to contract. The third seat valve assembly 104 is arranged in a meter-out circuit 107C, 108 at the time the hydraulic actuator 2 is so driven as to extend, at a location between the hydraulic actuator 2 and the second seat valve assembly 103. The fourth seat valve assembly 105 is arranged in a meter-out circuit 106C, 109 at the time the hydraulic actuator 2 is so driven as to contract, at a location between the hydraulic actuator 2 and the first seat valve assembly 102.

Arranged in the meter-in circuit line 106B between the first seat valve assembly 102 and the fourth seat valve assembly 105 is a check valve 110 for preventing hydraulic fluid from flowing back to the first seat valve assembly. Arranged in the meter-in circuit line 107B between the second seat valve assembly 103 and the third seat valve assembly 104 is a check valve 111 for preventing the hydraulic fluid from flowing back to the second seat valve assembly. Further, load lines 152, 153 are connected respectively to a location upstream of the check valve 110 in the meter-in circuit line 106B and at a location upstream of the check valve 111 in the meter-in circuit lien 107B. A common maximum load line 151A is connected to the load lines 152, 153 through respective check valves 155, 156.

The second flow control valve 101 also comprises the first through fourth seat valve assemblies 102A∼105A which are likewise arranged, and has a similar maximum load line 151B.

Further, the two maximum load lines 151A, 151B are connected to each other through a third maximum load line 151C which corresponds o the maximum load line 31 in the first embodiment. The load pressures at the two hydraulic actuators 2, 3 on the higher pressure sides thereof, that is, the maximum load pressure is detected at the maximum load lines 151A∼151C.

Furthermore, like the first embodiment, associated with the hydraulic pump 1 is the pump regulator 22 in which the maximum load pressure and the discharge pressure of the hydraulic pump 1 are inputted to the pump regulator 22 to load-sense-control and input-torque-limit-control the discharge rate of the hydraulic pump 1.

In the first flow control valve 100, generally speaking, the first through fourth seat valve assemblies 102~105 comprise seat-type main valves 112~115, pilot circuits 116~119 for the main valves, pilot valves 120~123 arranged in the pilot circuits, and pressure-compensating auxiliary valves 124, 125 and 126, 127 arranged upstream of the pilot valves in the pilot circuits, respectively.

The detailed construction of the first seat valve assembly 102 will be described with reference to FIG. 5.

In the first seat valve assembly 102, the seat-type main valve 112 has a valve element 132 for opening and closing an inlet 130 and an outlet 131. The valve element 132 is provided with a plurality of slits functioning as a variable restrictor 133 for varying an opening degree in proportion to a position of the valve element 132, that is, an opening degree of the main valve. Formed on the opposite side from the outlet 131 of the valve element 132 is a back-pressure chamber 134 communicating with the inlet 130 through the variable restrictor 133. Further, the valve element 132 is provided with a pressure receiving section 132A receiving inlet pressure at the main valve 112, that is, the discharge pressure Ps from the hydraulic pump 1, a pressure receiving section 132B receiving the pressure in the back-pressure chamber 134, that is, back pressure Pc, and a pressure receiving section 132C receiving outlet pressure Pa at the main valve 112.

The pilot circuit 116 is composed of pilot lines 135~137 through which the back-pressure chamber 134 communicates with the outlet 131 of the main valve 112. The pilot valve 120 is formed a valve element 139 which is driven by a pilot piston 138 and which constitutes a variable restrictor valve for opening and closing a passage between the pilot line 136 and the pilot line 137. Pilot pressure generated in accordance with an amount of operation of an operating lever (not shown) acts upon the pilot piston 138.

The seat valve assembly composed of a combination of the main valve 112 and the pilot valve 120 as described above (auxiliary valve 124 not included) is known as disclosed in U.S. Pat. No. 4,535,809. When the pilot valve 120 is operated, pilot flow rate depending on the opening degree of the pilot valve 120 is formed in the pilot circuit 116. The main valve 112 is opened to an opening degree in proportion to the pilot flow rate under the action of the variable restrictor 133 and the back-pressure chamber 134. Thus, main flow rate amplified in proportion to the pilot flow rate flows from the inlet 130 to the outlet 131 through the main valve 112.

The pressure-compensating auxiliary valve 124 comprises a valve element 140 constituting a variable restrictor valve, a first pressure receiving chamber 141 biasing the valve element 140 in a valve opening direction, and second, third and fourth pressure receiving chambers 142, 143, 144 arranged in opposed relation to the first pressure receiving chamber 141 for biasing the valve element 140 in a valve closing direction. The valve element 140 is provided with first through fourth pressure receiving sections 145~148 corresponding respectively to the first through fourth pressure receiving chamber 141~144. The first pressure receiving chamber 141 communicates with the back-pressure chamber 134 of the main valve 112 through a pilot line 149, The second pressure receiving chamber 142 communicates with the pilot line 136 of the auxiliary valve 124. The third pressure receiving chamber 143 communicates with the maximum load line 151A through a pilot line 150. The fourth pressure receiving chamber 144 communicates with the inlet 130 of the main valve 112 through a pilot line 152. With such an arrangement, the pressure within the back-pressure chamber 134, that is, the back pressure Pc is introduced to the first pressure receiving section 145. Inlet pressure Pz at the pilot valve 120 is introduced to the second pressure receiving section 146. Maximum load pressure Pamax is introduced to the third pressure receiving section 147. The discharge pressure Ps from the hydraulic pump 1 is introduced to the fourth pressure receiving section 148.

Let it be supposed here that a pressure receiving area of the first pressure receiving section 145 is ac, a pressure receiving area of the second pressure receiving section 146 is az, a pressure receiving area of the third pressure receiving section 147 is am, and a pressure receiving area of the fourth pressure receiving section 148 is as. Further, let it be supposed that, assuming that a pressure receiving area of the pressure receiving section 132A in the valve element 132 of the aforesaid main valve 112 is As and a pressure receiving area of the pressure receiving section 132B is Ac, a ratio between them is As/Ac=K. Then, the pressure receiving areas ac, az, am and as are so set as to have a ratio of $1:1-K:K\ (1-K):K^2$.

The detailed construction of the second seat valve assembly 103 is the same as that of the first seat valve assembly 102.

The detailed construction of the third seat valve assembly 104 will be described with reference to FIG. 6.

In the third seat valve assembly 104, the construction of the seat-type main valve 114 is the same as that of the main valve 112 of the first seat valve assembly 102. Like the main valve 112, the main valve 114 has an inlet 160, an outlet 161, a valve element 162, slits or a variable restrictor 163, a back-pressure chamber 164, and pressure receiving sections 162A, 162B and 162C of the valve element 162.

Further, the construction of each of the pilot circuit 118 and the pilot valve 122 is the same as that of the first seat valve assembly 102. The pilot circuit 118 is composed of pilot lines 165~167, and the pilot valve 122 is composed of a pilot piston 168 and a valve element 169.

Also in the seat valve assembly composed of a combination of the main valve 114 and the pilot valve 122 as described above (auxiliary valve 126 not included), main flow rate amplification in proportion to the pilot flow rate is obtained at the main valve 114 like the case of the first seat valve assembly 102.

The pressure-compensating auxiliary valve 126 comprises a valve element 170 constituting a variable restrictor valve, first and second pressure receiving chambers 171, 172 for biasing the valve element 170 in a valve opening direction, and third and fourth pressure receiving chambers 173, 174 arranged in opposed relation to the first and second pressure receiving chambers 171, 172, for biasing the valve element 170 in a valve closing direction. The valve element 170 is provided with first through fourth pressure receiving sections 175~178 corresponding respectively to the first through fourth pressure receiving chamber 171~174. The first pressure receiving chamber 171 communicates with the meter-in circuit line 107A (refer to FIG. 4) through a pilot line 179. The second pressure receiving chamber 172 communicates with the outlet of the pilot valve 132 through a pilot line 180. The third pressure receiving chamber 173 communicates with the maximum load line 151A (refer to FIG. 4) through a pilot line 181. The fourth pressure receiving chamber 174 communicates with the inlet of the pilot valve 132 through a pilot line 182. With such an arrangement, the discharge pressure Ps from the hydraulic pump 1 is introduced to the first pressure receiving section 175. Outlet pressure Pao at the pilot valve 120 is introduced to the second pressure receiving section 176. The maximum load pressure Pamax is introduced to the third pressure receiving section 177. Inlet pressure Pzo at the pilot valve 132 is introduced tot he fourth pressure receiving section 178.

Let it be supposed here that a pressure receiving area of the first pressure receiving section 175 is aso, a pressure receiving area of the second pressure receiving section 176 is aao, a pressure receiving area of the third pressure receiving section 177 is amo, and a pressure receiving area of the fourth pressure receiving section 178 is azo. Further, let it be supposed that, assuming that a pressure receiving area of the pressure receiving section 162A in the valve element 162 of the aforementioned main valve 114 is As and a pressure receiving area of the pressure receiving section 162B is Ac, a ratio between them is As/Ac=K, and a multiple of second power of a ratio between the pressure receiving area of the hydraulic actuator 2 on the inlet side thereof, that is, on the head side thereof and the pressure receiving area on the outlet side thereof, that is, on the rod side thereof is $\phi$. Then, the pressure receiving areas aso, aao, amo and azo are so set as to have a ratio of $\phi$K:1:$\phi$K:1.

The detailed construction of the fourth seat valve assembly 105 is the same as that of the third seat valve assembly 104.

The first and second seat valve assemblies 102A, 103A in the second flow control valve 101 area arranged similarly to the first seat valve assembly 102 in the first flow control valve 100. The third and fourth seat valve assemblies 10A, 105A are arranged similarly to the seat valve assembly 104.

OPERATION

The operation of the present embodiment constructed as above will next be described. The operation of the first and second seat valve assemblies 102, 103 and 102A, 103A in the first and second flow control valves 100, 101, and the operation of the third and fourth seat valve assemblies 104, 105 and 104A, 105A will first be described on behalf of the first seat valve assembly 102 and the third seat valve assembly 104.

FIRST SEAT VALVE ASSEMBLY 102

In the first seat valve assembly 102, a combination of the main valve 112 and the pilot valve 120 is known, and it as described above that the main flow rate amplified in proportion to the pilot flow rate formed in the pilot circuit 116 by the operation of the pilot valve 120 flows through the main valve 112. When the main valve 112 is operated in this manner, the balance of forces acting upon the valve element 132 can be expressed by the following equation, in view of the aforementioned relationship of *Ac/As=K:*

$$Pc=KPs+(1-K)Pa \quad (1).$$

On the other hand, considering the balance of forces acting upon the valve element 140 in the pressure-compensating auxiliary valve 124, the pressure receiving area ac of the pressure receiving section 145 is 1, the pressure area az of the pressure receiving section 146 is 1−K, the pressure receiving area am of the pressure receiving section 147 is K(1−K), and the pressure receiving area as of the pressure receiving section 148 is $K^2$, as mentioned previously, and accordingly, the following relationship exists:

$$Pc=(1-K)Pz+K(1-K)Pamax+K^2Ps \quad (2)$$

From this equation (2) and the above equation (1), if the differential pressure Pz−Pa between the inlet pressure and the outlet pressure at the pilot valve 120, the following relationship exists:

$$Pz-Pa=K(Ps-Pamax) \quad (3).$$

It is to be noted here that Ps−Pamax is a differential pressure between the maximum load pressure and the discharge pressure of the hydraulic pump 1, and that, in the present embodiment provided with the pump regulator 22 effecting the load sensing control, the differential pressure corresponds to the LS differential pressure described with reference to the first embodiment. Accordingly, if the differential pressure Pz−Pa across the pilot valve 120 is called VI differential pressure correspondingly to the first embodiment, the auxiliary valve 124 is adjusted in its opening degree so as to control the VI differential pressure, with a value obtained by multiplication of the LS differential pressure by K, as a compensating differential-pressure target value. Thus, the VI differential pressure is so controlled as to coincide substantially with a product of the LS differential pressure and K.

Accordingly, before the hydraulic pump 1 is saturated, the LS differential pressure is constant and, correspondingly, the compensating differential-pressure target value of the auxiliary valve 124 is made constant. Thus, the pilot valve 120 is pressure-compensatingly-controlled so that the VI differential pressure is made constant.

Further, when the hydraulic pump 1 is saturated, the LS differential pressure is brought to a smaller value reduced in accordance with the level of the saturation, so that the compensating differential-pressure target value of the auxiliary valve 124 likewise decreases. Thus, the pilot valve 120 is pressure-compensatingly-controlled that the VI differential pressure substantially coincides with a product of the reduced LS differential pressure and K.

As a result of the VI differential pressure control in the manner described above, the flow rate in accordance with the amount of operation of the pilot value 120 flows through the pilot circuit 116, before the hydraulic pump 1 is saturated, and the main flow rate multiplied by proportional times the former flow rate flows also through the main valve 112. On the other hand, after the hydraulic pump 1 has been saturated, the flow rate, which is reduced correspondingly to a decrease in the VI differential pressure to be less than the flow rate in accordance with the amount of operation of the pilot valve 120 flows through the pilot circuit 116, and the main flow rate, which is reduced correspondingly to the decrease in the VI differential pressure to be less than the flow rate amplified by proportional times the flow rate in accordance with the amount of operation of the pilot valve 1210, flows also through the main valve 112.

Further, if the aforementioned equation (2) is modified to obtain the differential pressure Pc−Pz across the auxiliary valve 124, the following relationship exists:

$$Pc-Pz=K(Pamax-Pa) \quad (4).$$

That is, the differential pressure across the auxiliary valve 124 is K times the difference between the maximum load pressure Pamax and the load pressure of the hydraulic actuator 2, that is, the load pressure Pa. Accordingly, in the sole operation of the hydraulic actuator 2 or the combined operation in which the hydraulic actuator 2 is an actuator on the higher pressure side, Pamax=Pa, so that the differential pressure across the auxiliary valve 124 is 0, that is, the auxiliary valve 124 is in a fully open state.

THIRD SEAT VALVE ASSEMBLY 104

Also in the third seat valve assembly 104, the main flow rate amplified in proportion to the pilot flow rate flowing through the pilot circuit 116 flows through the main value 114, by the known combination of the main valve 114 and the pilot valve 122.

On the other hand, in the pressure-compensating auxiliary valve 126, considering the balance of forces acting upon the valve element 103 in the auxiliary valve 126, the pressure receiving area aso of the pressure receiving section 175 is $\phi$K, the pressure receiving area aao of the pressure receiving section 176 is 1, the pressure receiving area amo of the pressure receiving area 177 is $\phi$K, and the pressure receiving area azo of the pressure receiving section 178 is 1, as mentioned previously and, therefore, the following relationship exists:

$$Pzo-Pao=\phi K(Ps-Pamax) \quad (5).$$

Accordingly, from the equations (3) and (5), the following equation is obtained:

$$Pzo-Pao=\phi(Pz-Pa) \quad (6).$$

It is to be noted here that Pzo−Pao is the differential pressure across the pilot valve 122, and Pz−Pa is the differential pressure across the pilot valve 120 in the first seat valve assembly 102 on the side of the meter-in circuit. Accordingly, if the differential pressure Pz−Pa across the pilot valve 120 and the differential pressure Pzo−Pao across the pilot valve 122 are called, respectively, the VI differential pressure and the VO differential pressure correspondingly to the description of the first embodiment, the auxiliary valve 126 controls the VO differential pressure, with a value of a product of the VI differential pressure and $\phi$ as a compensating differential-pressure target value, from the equation (6). For this reason, the pilot flow rate passing through the pilot valve 122 is so controlled as to be brought to a fixed relationship with respect to the pilot flow rate passing through the pilot valve 120 of the meter-in circuit, and the main flow rate flowing through the main valve 114 is also so controlled as to be brought to a fixed relationship with respect to the main flow rate flowing through the main valve 112 of the meter-in circuit, from the above-described proportional amplification relationship between the pilot flow rate and the main flow rate. Further, as a result that the pilot flow rate is controlled in accordance with a value of a product of the VI differential pressure and $\phi$ as a compensating differential-pressure target value, the above fixed relationship is maintained regardless of the cases prior to saturation of the hydraulic pump 1 and after the saturation thereof.

Accordingly, like the first embodiment, it is possible to always bring the flow rate of the return fluid flowing through the meter-out circuit into coincidence with the flow rate discharged by the driving of the hydraulic actuator due to the flow-rate control of the meter-in circuit. Hereunder, this will further be described.

In the first seat valve assembly 102, the main flow rate flowing through the main valve 112 on the basis of the aforesaid operation will first be obtained. Since, as described previously, the main flow rate is the flow rate amplified by proportional times the pilot flow rate, if it is supposed that the main flow rate is q, the pilot flow rate qp, and the proportional constant of the amplification is g, the following equation exists:

$$q=g\cdot qp \quad (7).$$

In addition, if it is supposed that the opening area of the pilot valve 120 is Wp, and a flow-rate coefficient is Cp, and density of the hydraulic fluid in $\rho$, because the differential pressure across the pilot valve in Pz−Pa, the pilot flow rate can be expressed as follows:

$$qp = Wp\cdot Cp\sqrt{(2/\rho)(Pz-Pa)} \quad (8)$$

From the equations (3), (7) and (8), the following relationship exists:

$$q = g\cdot Wp\cdot Cp\times\sqrt{(2/\rho)K(Ps-Pamax)} \quad (9)$$

The main flow rate q is flow rate flowing through the meter-in circuit for the hydraulic actuator 2, and this flow rate q is supplied to the head side of the hydraulic actuator 2.

The flow rate q represented by the above equation (9) is supplied to the head side of the hydraulic actuator 2, as described above. However, if it is supposed here that q·Wp·Cp is equal to gi, the following relationship exists:

$$q = gi\sqrt{(2/\rho)K(Ps-Pamax)} \quad (10)$$

Let it be supposed now that a ratio of the pressure receiving area on the rod side of the hydraulic actuator 2 with respect to the head side thereof is $\lambda$. Then, the flow rate qo of the return fluid discharged from the rod side of the hydraulic actuator 2 driven by supply of the flow rate q to the head side is as follows:

$$\begin{aligned} qo &= \lambda\cdot q \\ &= \lambda\cdot gi\times\sqrt{(2/\rho)K(Ps-Pamax)} \end{aligned} \quad (11)$$

Further, the flow rate flowing to the meter-out circuit line 108 through the third seat valve assembly 104 is the sum of the flow rate qpo flowing through the pilot circuit 118 following the operation of the pilot valve 122 in the second seat valve assembly and the flow rate qpm passing through the main valve 114. If it is supposed that this sum is equal to the flow rate qo discharged from the rod side of the hydraulic actuator 2, the following relationship exists:

$$qo = qpo + qpm \qquad (12).$$

Let it be supposed here that, since the flow rate qpm passing through the main valve 114 is proportional times the pilot flow rate qpo, the proportionally constant is N. Then, the following relationship exists:

$$Qpm = N\,qpo \qquad (13).$$

Accordingly, the following relationship exists:

$$\begin{aligned} qo &= qpo + N\,qpo \\ &= (1+N)qpo \end{aligned} \qquad (14)$$

Since, further, the differential pressure across the pilot valve 122 is Pzo−Pao, the following relationship exists, similarly to the above equation (8):

$$qpo = Wp \cdot Cp \times \sqrt{(2/\rho)(Pzo - Pao)} \qquad (15)$$

From this equation (15) and the equation (14), the following relationship is obtained:

$$qo = (1+N)Wp \times Cp\sqrt{(2/\rho)(Pzo - Pao)} \qquad (16)$$

Let it be supposed here that (1+N)Wp·Cp is go. Then, from the equations (11) and (16), the following relationship exists:

$$\begin{aligned} qo &= \lambda \cdot gi \times \sqrt{(2/\rho)K(Ps - Pa\max)} \\ &= go\sqrt{(2/\rho)(Pzo - Pao)} \end{aligned} \qquad (17)$$

That is, the following relationship exists:

$$Pzo - Pao = (\lambda \cdot gi/go)^2 K(Ps - Pa\max) \qquad (18)$$

Here, $(\lambda \cdot gi/go)^2$ is a multiple of second power of the ratio λ of the area on the rod side of the hydraulic actuator 2 with respect to the area on the head side, and can be replaced by the previously mentioned φ. Accordingly the equation (18) can be expressed as follows:

$$Pzo - Pao = \phi K(Ps - Pamax) \qquad (19).$$

This equation coincides with the previous equation (5). That is, in the present embodiment in which the pressure receiving area aso of the pressure receiving section 175. The pressure receiving area aao of the pressure receiving section 176, the pressure receiving area amo of the pressure receiving section 177 and the pressure receiving area azo of the pressure receiving section 178 of the auxiliary valve 126 are set to the aforesaid predetermined relationship, the sum of the flow rate qpo passing through the pilot valve 122 and the main flow rate qpm passing through the main valve 114 (the total flow rate flowing through the third seat valve assembly 104) is made equal to the flow rate of the return fluid discharged from the rod side of the hydraulic actuator driven by supply of the hydraulic fluid to the head side.

OPERATION AS ENTIRE SYSTEM

As will be clear from the above description, the first and second seat valve assemblies 102, 103 and 102A, 102B arranged in the meter-ib circuits control the main flow rate flowing through the main valves 112, 113 of the meter-in circuits, while effecting the pressure compensating control on the basis of a value determined by the LS differential pressure like the combination of the flow control valve 14 and the pressure-compensating auxiliary valve 15 in the first embodiment, by the previously described operation of the pressure-compensating auxiliary valves 124, 125 arranged in the pilot circuits.

Accordingly, like the first embodiment, in the sole operations of the hydraulic actuator 2 or 3, even if the load pressure in the meter-in circuit for the hydraulic actuator 2 or 3 fluctuates, the main flow rate is controlled to a value in accordance with the requisite flow rate, so that precise flow-rate control is made possible without being influenced by fluctuation in the load pressure. Further, in the combined operation of the hydraulic actuators 2, 3, it is ensured that the discharge flow rate is distributed to the hydraulic actuators 2, 3, regardless of the cases prior to saturation of the hydraulic pump 1 and after the saturation thereof, so that smooth combined operation is made possible.

Further, the third and fourth seat valve assemblies 104, 105 and 104A, 105A arranged in the meter-out circuit control the main flow rate flowing through the main valves 114, 115 of the meter-out circuits so as to be brought to a fixed relationship with respect to the main flow rate flowing through the main valves 112, 113 of the meter-in circuits, by the aforesaid operation of the pressure-compensating auxiliary valves 126, 172 arranged in the pilot circuits, similarly to the combination of the flow control valve 14 and the pressure-compensating auxiliary valve 18 in the first embodiment.

Accordingly, like the first embodiment in case where a negative load such as an inertial load or the like acts upon the hydraulic actuator 2 or 3, regardless of the sole operation of the hydraulic actuators 2, 3 and the combined operation thereof, the flow rate of the return fluid flowing through the meter-out circuit is so controlled as to coincide with the flow rate discharged by driving of the hydraulic actuator due to the flow-rate control of the meter-in circuit, in either case prior to saturation of the hydraulic pump 1 or after the saturation thereof, so that it is possible to prevent fluctuation in pressure in the meter-out circuit. Further, it is possible to prevent occurrence of cavitation in the meter-in circuit due to breakage of the balance between the flow rate of the hydraulic fluid supplied to the hydraulic actuator and the flow rate of the hydraulic fluid discharged from the hydraulic actuator.

Furthermore, since, in the present embodiment, the pressure-compensating auxiliary valves 124∼127 are arranged not in the main circuits, but in the pilot circuits, it is possible to reduce pressure loss of the hydraulic fluid flowing through the main circuits. Further, as described with reference to the equation (4), upon the sole operation of the hydraulic actuator or in the hydraulic actuator on the higher pressure side in the combined operation, the auxiliary valve 124 is in a fully open state. Accordingly, it is possible to restrict pressure loss in the pilot circuit to the minimum.

OTHER EMBODIMENTS

Still another embodiment of the invention will be described with reference to FIGS. 7 and 8. In the figures, the same component parts as those illustrated in FIGS. 4 and 6 are designated by the same reference numerals. The present embodiment differs from the previously described embodiments in the arrangement of the pressure-compensating auxiliary valve in the third seat valve assembly.

Figure 7:
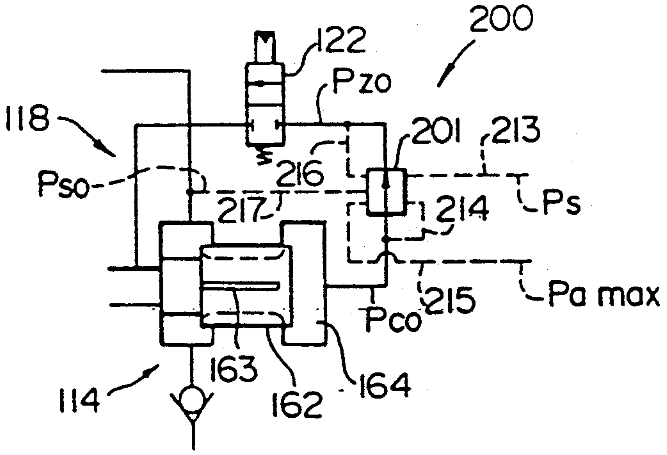
FIG. 7 is a circuit diagram showing a third seat valve assembly portion of a hydraulic driving apparatus according to another embodiment of the invention.
Figure 8:
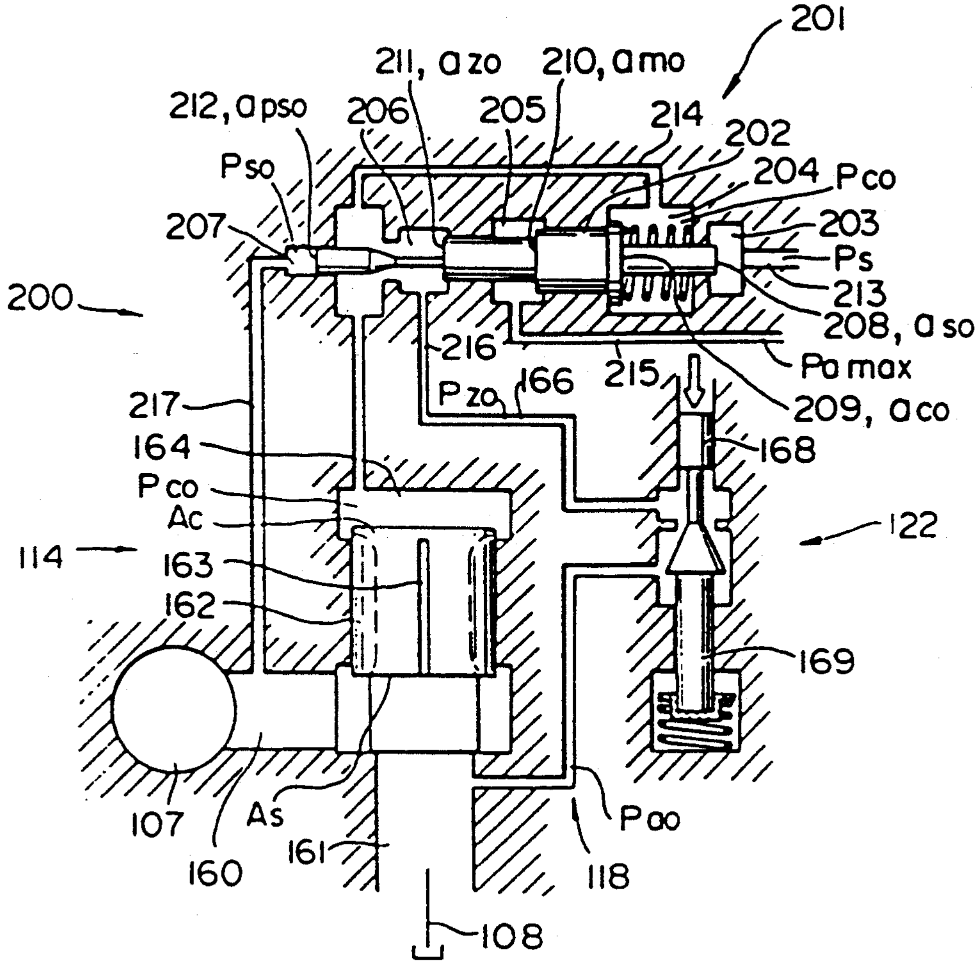
FIG. 8 is a detailed view of the third seat valve assembly.

In FIGS. 7 and 8, a pressure-compensating auxiliary valve 301 included in a third seat valve assembly 200 comprises a valve element 202 constituting a variable restrictor valve, first and second pressure receiving chambers 203, 204 biasing the valve element 202 in a valve opening direction, and third, fourth and fifth pressure receiving chambers 205~207 biasing the valve element 202 in a valve closing direction. The valve element 202 is provided with first through fifth pressure receiving sections 208~212 corresponding respectively to first through fifth pressure receiving chambers 203~207. The first pressure receiving chamber 203 communicates with the meter-in circuit line 107A (refer to FIG. 4) through a pilot line 213. The second pressure receiving chamber 204 communicates with the back-pressure chamber 164 of the main valve 114 through a pilot line 214. The third pressure receiving chamber 205 communicates with the maximum load line 151A (refer to FIG. 4) through a pilot line 215. The fourth pressure receiving chamber 206 communicates with the inlet of the pilot valve 122 through a pilot line 216. The fifth pressure receiving chamber 207 communicates with the inlet 160 of the main valve 114 through a pilot line 217. With such an arrangement, the discharge pressure Ps from the hydraulic pump 1 is introduced to the first pressure receiving section 208. The pressure Pco at the back-pressure chamber 164 is introduced to the second pressure receiving section 209. The maximum load pressure Pamax is introduced to the third pressure receiving section 210. The inlet pressure Pzo at the pilot valve 132 is introduced to the fourth pressure receiving section 211. The inlet pressure Pso at the main valve 114 is introduced to the fifth pressure receiving section 212.

Let it be supposed here that a pressure receiving area of the first pressure receiving section 208 is aso, a pressure receiving area of the second pressure receiving section 209 is aco, a pressure receiving area of the third pressure receiving section 210 is amo, a pressure receiving area of the fourth pressure receiving section 211 is azo, and a pressure receiving area of the fifth pressure receiving section 212 is apso. Further, let it be supposed that, assuming that a pressure receiving area of the pressure receiving section 162A in the valve element 162 of the main valve 114 is As and a pressure receiving area of the pressure receiving section 162B is Ac, a ration between them is As/Ac=K, and a multiple of second power of a ratio between the pressure receiving area on the inlet side of the hydraulic actuator 2, that is, the pressure receiving area on the head side and the pressure receiving area on the outlet side, that is, on the rod side is $\phi$. Then, the pressure receiving areas aso, aco, amo, azo, and apso are so set to have a ratio of $\phi K(1-K):1:\phi K(1-K):1-K:K$.

In the present embodiment constructed as above, considering the balance of forces acting upon the valve element 132 of the main valve 112, the following equation exists, from the relationship of Ac/As=K, similarly to the previously mention equation (1):

$$Pcs = KPso + (1-K)Pao \tag{20}$$

Further, considering the balance of forces acting upon the valve element 202 in the pressure-compensating auxillary valve 201, the pressure receiving area aso of the first pressure receiving section 208 is $\phi K(1-K)$, the pressure receiving area aco of the second pressure receiving section 209 is 1, the pressure receiving area amo of the third pressure receiving section 210 is $\phi K(1-K)$, the pressure receiving area azo of the fourth pressure receiving section 211 is $1-K$, and the pressure receiving area apso of the fifth pressure receiving section 212 is K, as mentioned above and, therefore, the following relationship exists:

$$Pzo(1-K) + PsoK + Pamax\phi K(1-K) = Pco + Ps\phi K(1-K) \tag{21}$$

From the equations (20) and (21), the following relationship exists:

$$Pzo - Pao = \phi K(Ps - Pamax) \tag{22}$$

This equation (22) coincides with the previously mentioned equation (5).

Accordingly, the present embodiment in which the pressure receiving area aso of the first pressure receiving section 208, the pressure receiving area aco of the second pressure receiving section 209, the pressure receiving area amo of the third pressure receiving section 210, the pressure receiving section azo of the fourth pressure receiving section 211, and the pressure receiving area apso of the fifth pressure receiving section 212 are set to the ration of $\phi K(1-K):1:\phi K(1-K):1-K:K$, also controls the main flow rate flowing through the main valve 114 so as to be brought to a fixed relationship with respect to the main flow rate flowing through the main valve 112 (refer to FIG. 4) of the meter-in circuit, similarly to the third embodiment, so that it is possible to always bring the flow rate of the return fluid flowing through the meter-out circuit into coincidence with the flow rate discharged by driving the hydraulic actuator due to the flow-rate control of the meter-in circuit. For this reason, it is possible to prevent pressure fluctuation in the meter-out circuit, and it is possible to prevent occurrence of cavitation in the meter-in circuit.

Still another embodiment of the invention will be described with reference to FIGS. 9 and 10. In the figures, the same component parts as those illustrated in FIGS. 4 and 6 are designated by the same reference numerals. The present embodiment is still another modification of the pressure-compensating auxiliary valve in the third seat valve assembly.

Figure 9:
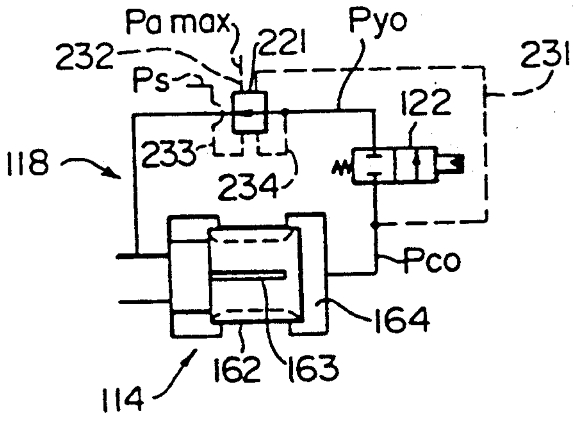
FIG. 9 is a circuit diagram showing a third seat valve assembly portion of a hydraulic driving apparatus according to still another embodiment of the invention.
Figure 10:
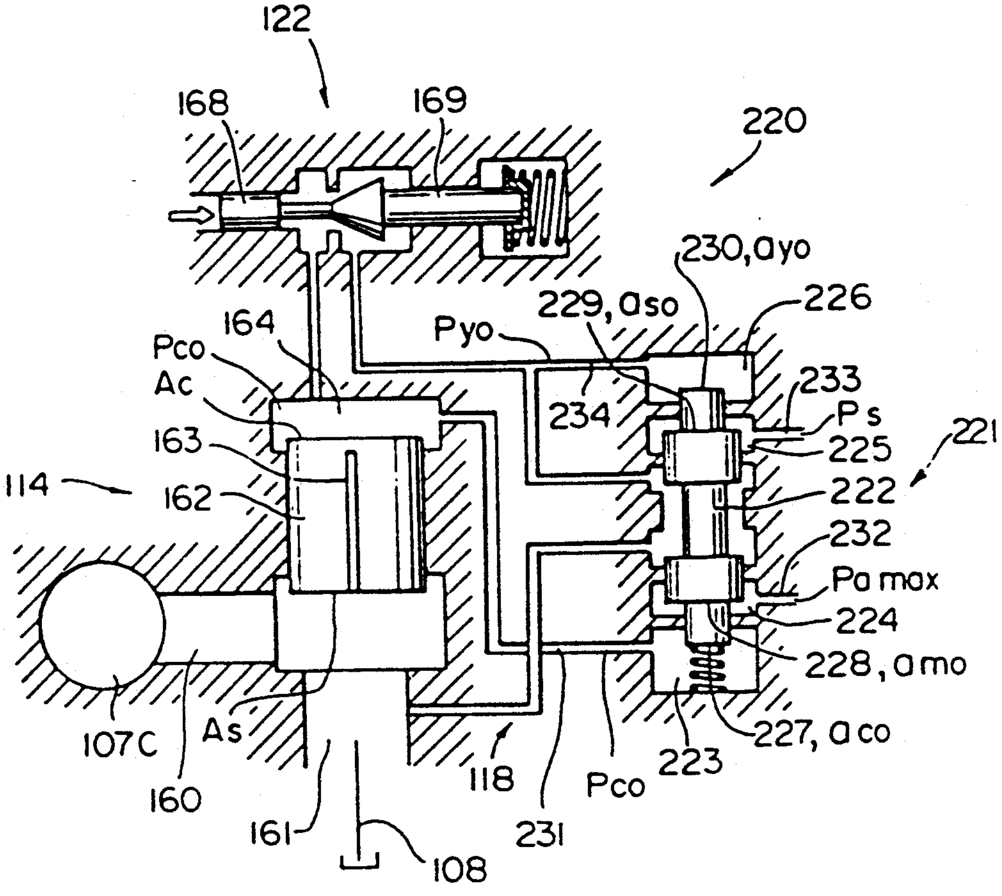
FIG. 10 is a detailed view of the third seat valve assembly.

In FIGS. 9 and 10, a pressure-compensating auxiliary valve 221 included in a third seat valve assembly 220 is arranged in the pilot circuit 118 on the side downstream of the pilot valve 122, unlike the previously described embodiments. This auxiliary valve 221 comprises a valve element 222 constituting a variable restrictor valve, first and second pressure receiving chambers 223, 224 biasing the valve element 222 in a valve opening direction, and third and fourth pressure receiving chambers 225, 226 biasing the valve element 222 in a valve closing direction. The valve element 222 is provided with first through fourth pressure receiving section 227~230 corresponding respectively to the first through fourth pressure receiving chambers 223~226.

The first pressure receiving chamber 223 communicates with the back-pressure chamber 164 of the main valve 114 through a pilot line 231. The second pressure receiving chamber 224 communicates with the maximum load line 151A (refer to FIG. 4) through a pilot line 232. The third pressure receiving chamber 225 communicates with the meter-in circuit line 107A (refer to FIG. 4) through a pilot line 233. The fourth pressure receiving chamber 226 communicates with the outlet of the pilot valve 122 through a pilot line 234. With such arrangement, the pressure Pco at the back-pressure chamber 164 is introduced to the first pressure receiving section 227, the maximum load pressure Pamax is introduced to the second pressure receiving section 228, the discharge pressure Ps at the hydraulic pump 1 is introduced to the third pressure receiving section 229, and the outlet pressure Pyo at the pilot valve 122 is introduced to the fourth pressure receiving section 230.

Let it be supposed here that a pressure receiving area of the first pressure receiving section 227 is aco, a pressure receiving area of the second pressure receiving section 228 is amo, a pressure receiving area of the third pressure receiving section 229 is aso, and a pressure receiving area of the fourth pressure receiving section 230 is ayo. Further, let it be supposed that, assuming that a pressure receiving area of the pressure receiving section 162A in the valve element 162 of the main valve 114 is As and a pressure receiving area of the pressure receiving section 162B is Ac, a ration between them is $As/Ac=K$, and a multiple of second power of a ratio between the pressure receiving area on the inlet side of the hydraulic actuator 2, that is, on the head side thereof and the pressure receiving area on the outlet side thereof, that is, the rod side thereof is $\phi$. Then, the pressure receiving areas aco, amo, aso and ayo are so set to have a ration of $1:\phi K:\phi K:1$.

In the present embodiment constructed as above, considering the balance of forces acting upon the valve element 222 in the pressure-compensating auxiliary valve 221, the pressure receiving area aco of the first pressure receiving section 227 is 1, the pressure receiving area amo of the second pressure receiving section 228 is $\phi K$, the pressure receiving area aso of the third pressure receiving section 229 is $\phi K$, and the pressure receiving area ayo of the fourth pressure receiving section 230 is 1, as described above and, therefore, the following relationship exists:

$$Pco+\phi KPamax=Ps\phi K+Pyo \quad (23).$$

That is, $$Pco-Pyo=\phi K(Ps-Pamax) \quad (24)$$

Since, here, the pressure Pco at the back-pressure chamber 164 of the main valve 114 coincides with the inlet pressure at the pilot valve 122, and Pyo is the outlet pressure at the pilot valve 122, the above equation (24) coincides with the previously described equation (5).

Accordingly, the present embodiment in which the pressure receiving area aco of the first pressure receiving section 227, the pressure receiving area amo of the second pressure receiving section 228, the pressure receiving area aso of the third pressure receiving section 229 and the pressure receiving area ayo of the fourth pressure receiving section 230 are set to the ratio of $1:\phi K:\phi K:1$, also controls the main flow rate flowing through the main valve 114 so as to be brought to a fixed relationship with respect to the main flow rate flowing through the main valve 112 (refer to FIG. 4) of the meter-in circuit, similarly to the third embodiment, so that it is possible to always bring the flow rate of the return fluid flowing through the meter-out circuit into coincidence with the flow rate discharged by driving the hydraulic actuator due to the flow-rate control of the meter-in circuit. For this reason, it is possible to prevent pressure fluctuation in the meter-out circuit, and it is possible to prevent occurrence of cavitaiton in the meter-in circuit.

Still another embodiment of the invention will be described with reference to FIGS. 11 and 12. In the figures, the same component parts as those illustrated in FIGS. 4 and 6 are designated by the same reference numerals. The present embodiment shows still another modification of the pressure-compensating auxiliary valve in the third seat valve assembly.

Figure 11:
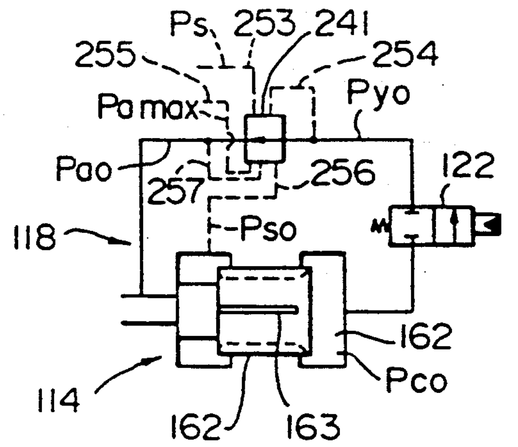
FIG. 11 is a circuit diagram showing a third seat valve assembly portion of a hydraulic driving apparatus according to another embodiment of the invention.
Figure 12:
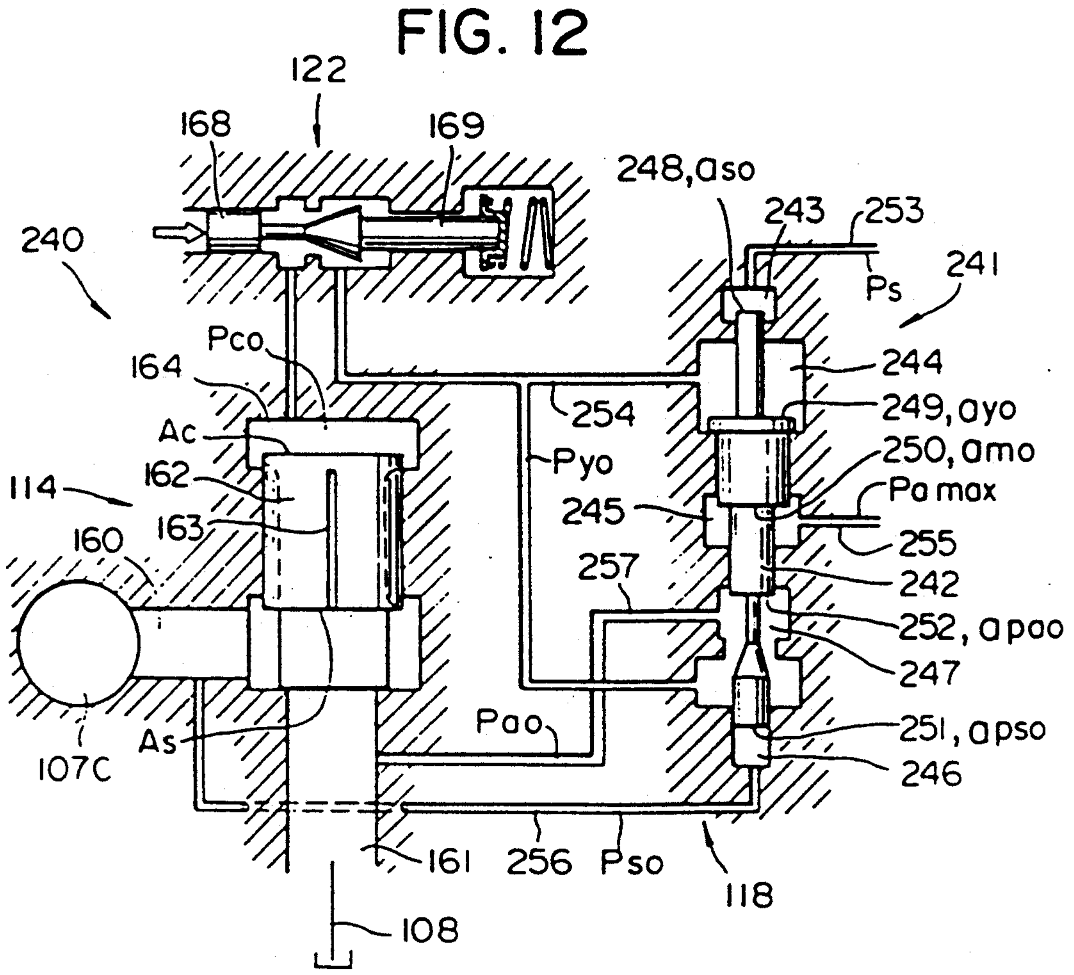
FIG. 12 is a detailed view of the third seat valve assembly.

In FIGS. 11 and 12, a pressure-compensating auxiliary valve 241 included in a third seat valve assembly 240 is arranged in the pilot circuit 118 on the side downstream of the pilot valve 122, similarly to the embodiment illustrated in FIGS. 9 and 10. This auxiliary valve 241 comprises a valve element 242 constituting a variable restrictor valve, first and second pressure receiving chambers 243, 244 biasing the valve element 242 in a valve opening direction, and third, fourth and fifth pressure receiving chambers 245~247 biasing the valve element 242 in a valve closing direction. The valve element 242 is provided with first through fifth pressure receiving sections 248~252 corresponding respectively to the first through fifth pressure receiving chambers 243~247. The first pressure receiving chamber 243 communicates with the meter-in circuit line 107A (refer to FIG. 4) through a pilot line 253. The second pressure receiving chamber 244 communicates with the outlet of the pilot valve 132 through a pilot line 254. The third pressure receiving chamber 245 communicates with the maximum load line 151A (refer to FIG. 4) through a pilot line 255. The fourth pressure receiving chamber 246 communicates with the inlet 160 of the main valve 114 through a pilot line 256. The fifth pressure receiving chamber 247 communicates with the outlet 161 of the main valve 114 through a pilot line 257. With such an arrangement, the discharge pressure Ps at the hydraulic pump 1 is introduced to the first pressure receiving section 248. The outlet pressure Pyo at the pilot valve 122 is introduced to the second pressure receiving section 249. The maximum load pressure Pamax is introduced to the third pressure receiving section 250. The inlet pressure Pso at the main valve 114 is introduced to the fourth pressure receiving section 251. The outlet pressure Pao at the main valve 114 is introduced to the fifth pressure receiving section 252.

Let it be supposed here that a pressure receiving area of the first pressure receiving section 248 is aso, a pressure receiving area of the second pressure receiving section 249 is ayo, a pressure receiving area of the third pressure receiving section 250 is amo, a pressure receiving area of the fourth pressure receiving section 251 is apso, and a pressure receiving area of the fifth pressure receiving section 252 is apo. Further, let it be supposed that, assuming that a pressure receiving area of the pressure receiving section 162A in the valve element 162 of the main valve 114 is As and a pressure receiving area of the pressure receiving section 162B is Ac, a ratio between them is $As/Ac=K$, and a multiple of second power of a ratio between the pressure receiving area on the inlet side of the hydraulic actuator 2, that is on the head side thereof and the pressure receiving area on the outlet side thereof, that is, on the rod side thereof is $\phi$. Then, the pressure receiving areas aso, ayo, amo, apso and apao are so set as to have a ratio of $\phi K:1:\phi K:K:1-K$.

In the present embodiment constructed as above, the previously mentioned equation (20) exists, by the balance of forces acting upon the valve element 132 of the main valve 112:

$$Pco = KPso + (1-K)Pao \quad (20).$$

Further, considering the balance of forces acting upon the valve element 242 in the pressure-compensating auxiliary valve 241, the pressure receiving area aso of the first pressure receiving section 248 is $\phi K$, the pressure receiving area ayo of the second pressure receiving section 249 is 1, the pressure receiving area amo of the third pressure receiving section 250 is $\phi K$, the pressure receiving area apso of the fourth pressure receiving section 251 is K, and the pressure receiving area apao of the fifth pressure receiving section 252 is $1-K$, as mentioned above and, therefore, the following relationship exists:

$$Pyo + Ps\phi K = KPso + (1-K)Pao + \phi KPamax \quad (25)$$

From the equations (20) and (25), the following relationship exists:

$$Pco - Pyo = \phi K(Ps - Pamax) \quad (26).$$

This equation (26) coincides with the previously mentioned equation (24).

Accordingly, this embodiment in which the pressure receiving area aso of the first pressure receiving section 248, the pressure receiving area ayo of the second pressure receiving section 249, the pressure receiving area amo of the third pressure receiving section 250, the pressure receiving area apso of the fourth pressure receiving section 251 and the pressure receiving section apao of the fifth pressure receiving section 252 are set to the ratio of $\phi K:1:\phi K:K:1-K$, also controls the main flow rate flowing through the main valve 114 so as to be brought to a fixed relationship with respect to the main flow rate flowing through the main valve 112 (refer to FIG. 4) of the meter-in circuit, similarly to the third embodiment. I is thus possible always to bring the flow rate of the return fluid flowing through the meter-out circuit into coincidence with the flow rate discharged by driving of the hydraulic actuator due to the flow-rate control of the meter-in circuit. For this reason, it is possible to prevent pressure fluctuation in the meter-out circuit, and it is possible to prevent occurrence of cavitation in the meter-in circuit.

REGARDING MODIFICATION OF EMBODIMENTS

The arrangement of each of the above embodiments illustrated in FIGS. 4 through 12 is such that the pressure-compensating auxiliary valves 124, 125 are arranged upstream of the pilot valves 120, 121, as the seat valve assemblies 102, 103 and 102A, 102B on the side of the meter-in circuit; the auxiliary valve is provided with the first pressure receiving section 145 biasing the valve element 140 in the valve opening direction, and the second, third and fourth pressure receiving section 146~148 biasing the valve element 140 in the valve closing direction; the back pressure Pc, the pilot-valve inlet pressure Pz, the maximum load pressure Pamax and the pump discharge pressure Ps are introduced respectively to these pressure receiving sections 145~148; the pressure receiving areas of these pressure receiving sections are so set as to be brought to the ratio of $1:1-K:K(1-K):K^2$. However, the applicant of this application has filed the invention of a flow control valve composed of a seat valve assembly having a special pressure compensating function, as Japanese Patent Application No. SHO 63-163646 on June 30, 1988, and various modification can be made to the seat valve assembly on the side of the meter-in circuit, on the basis of the concept of the invention of the prior application. An example will be described below.

Figure 5:
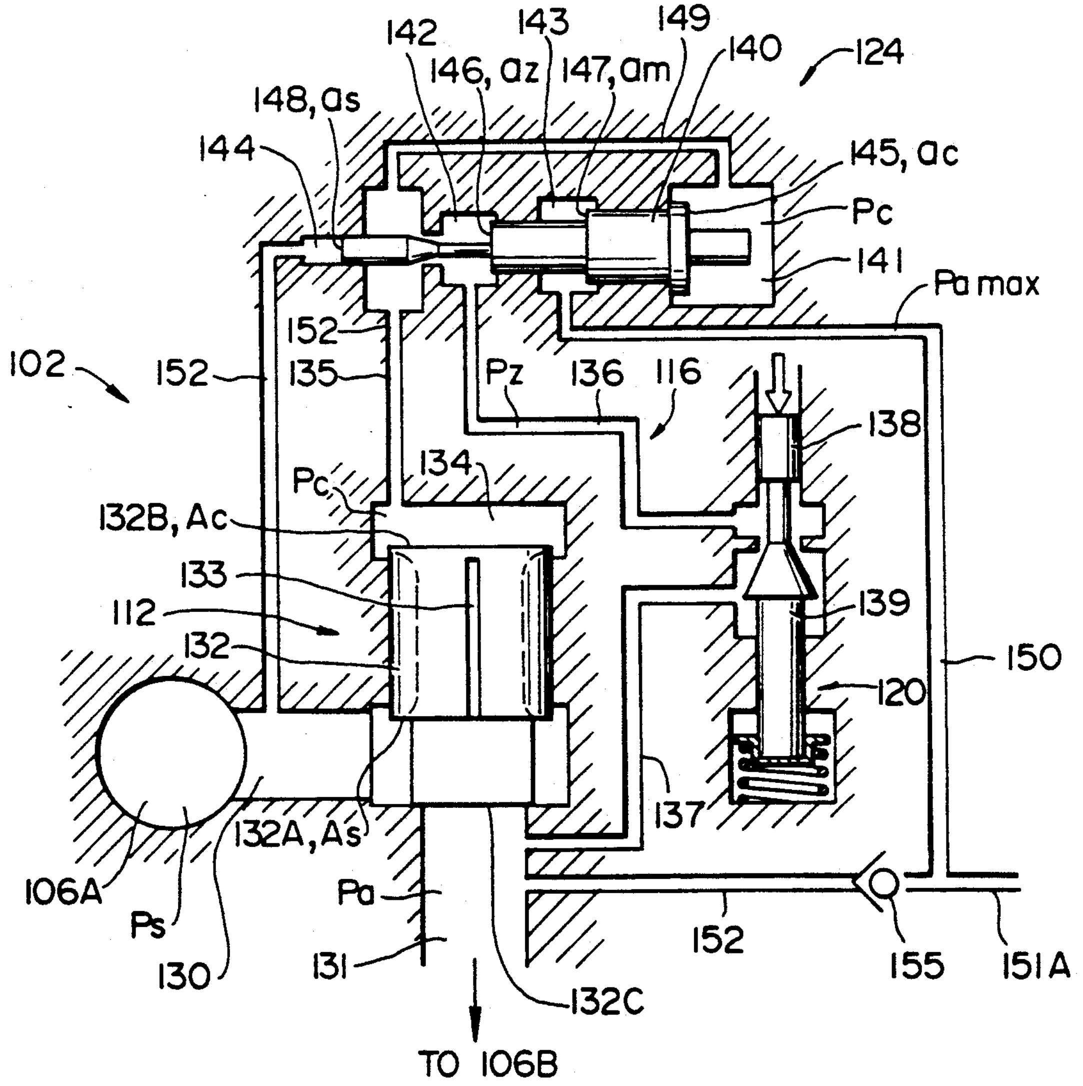
FIG. 5 is a detailed view of a first seat valve assembly of the hydraulic driving apparatus.
Figure 6:
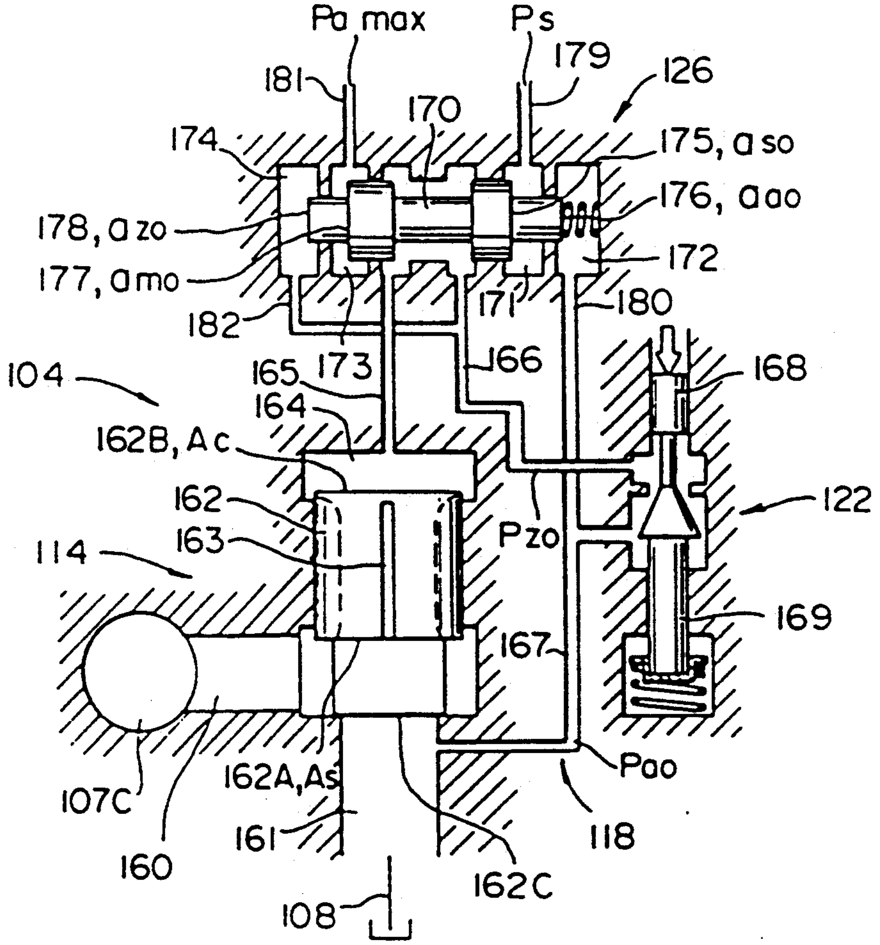
FIG. 6 is a detailed view of a third seat valve assembly of the hydraulic driving apparatus.

In the seat valve assembly 102 illustrated in FIG. 5, although the details are omitted, the following equation generally exists, from the balance of the pressures acting upon the valve element 132 of the main valve 112 and the valve element 140 of the pressure-compensating auxiliary valve 124:

$$Pz - Pa = \alpha(Ps - Pamax) + \beta(Pamax - Pa) + \gamma Pa \quad (27)$$

Here, Pz, Pa, Ps and Pamax are the inlet pressure at the pilot valve 120, the load pressure of the associated hydraulic actuator, the discharge pressure of the hydraulic pump 1, and the maximum load pressure, respectively. Further, $Pz-Pa$ on the left-hand side is the differential pressure across the pilot valve 120, and can be replaced by $\Delta Pz$. Furthermore, $\alpha$, $\beta$ and $\gamma$ are values expressed by the pressure receiving areas ac, az, am and as of the pressure receiving sections 145~148 of the auxiliary valve 124 and the pressure receiving areas As and Ac of the pressure receiving sections 132A, 132B of the main valve 112, and are constants determined by setting of these pressure receiving areas. However, $\alpha$ is in the relationship of $\alpha \leq K$ with respect to the aforesaid $K(=As/Ac)$.

In this manner, generally, in the pressure-compensating auxiliary valve represented by the equation (27), setting of the constants $\alpha$, $\beta$ and $\gamma$, that is, the pressure receiving areas to optional values enables the differential pressure $\Delta Pz$ across the pilot valve 120 to be controlled in proportion respectively to three elements which include the differential pressure $Pa-Pamax$ between the discharge pressure Ps of the hydraulic pump 1 and the maximum load pressure Pamax, the differential pressure $Pamax-Pa$ between the maximum load pressure Pamax and the own load pressure Pa, and the load pressure Pa. Thus, it is possible to obtain a pressure-compensating and distributing function (first term on the right side), and/or a harmonic function (second term on the right side) in the combined operation on the basis of the pressure-compensating and distributing function, and/or a self-pressure compensating function (third term on the right side).

If the replacement is made in the equation (27) such that $\alpha=K$, $\beta=0$ and $\gamma=0$, the previously mentioned equation (3) is obtained:

$$Pz - Pa = K(Ps - Pamax) \quad (3).$$

In other words, the embodiment illustrated in FIGS. 4 and 5 is an embodiment in which $\alpha=K$, $\beta=0$ and $\gamma=0$ and which is given only the pressure-compensating and distributing function of the general functions of the pressure-compensating auxiliary valve 124.

As described above, the pressure-compensating auxiliary valve 124 illustrated in FIGS. 4 and 5 is not generally required to be limited to $\alpha=K$ as in the equation (3), but can have an optional value (optional pressure receiving area) within a range of $\alpha\leqq K$. Also in the invention, it is possible to employ an auxiliary valve in which $\alpha$ other than K is set. Also in this case, by modifying the pressure receiving area of the pressure-compensating auxiliary valve correspondingly to this, the main flow rate flowing through the main valve is so controlled as to be brought to a fixed relationship with respect to the flow rate flowing through the main valve of the meter-in circuit, similarly to the embodiment in which $\alpha=K$, whereby advantages can likewise be obtained. In this connection, in the above embodiment in which $\alpha-K$, in case of the sole operation of the hydraulic actuators or in the hydraulic actuator 2 on the higher pressure side in the combined operation, the auxiliary valve can be brought substantially to the fully open state, as described previously by the use of the equation (4), making it possible to provide a circuit arrangement that is lowest in pressure loss.

Further, the auxiliary valve 124 can generally be given a harmonic function (second term on the right side) in the combined operation and/or the self-pressure-compensating function (third term on the right side), depending upon the manner of setting of the pressure receiving area, without being limited to the pressure-compensating and distributing function. Also the invention may employ an auxiliary valve which is so modified as to be given functions other than the pressure-compensating and distributing functions.

Furthermore, the above is an example of the arrangement of the pressure receiving sections and the pilot lines illustrated in FIGS. 4 and 5. As disclosed in Japanese Patent Application No. SHO 63-163646, in the arrangement of the pressure receiving sections and the pilot lines, there are various forms other than the one mentioned above. The arrangement may take any form as a result if the above equation (28) holds.

The possibility of modification of the seat valve assembly on the side of the meter-in circuit has been described above. However, the same is applicable also to the seat valve assembly on the side of the meter-out circuit. That is, the pressure-compensating auxiliary valve described with reference to FIGS. 4 through 12 should be so constructed as to satisfy substantially the previously mentioned equation (5), that is, the following equation:

$$Pzo-Pao=\phi K(Ps-Pamax) \quad (5)$$

It is possible to variously modify the arrangement of the pressure receiving sections of the auxiliary valve and the pilot lines within a range satisfying the above relationship.

Moreover, in all the above embodiments, the flow rate of the return fluid flowing through the meter-out circuit is so controlled as to coincide with the flow rate discharged by driving of the hydraulic actuator due to the flow-rate control of the meter-in circuit. Considering practicality, however, the arrangement may be such that the relationship between them is slightly modified so that pressure has a tendency to be confined within the hydraulic actuator 2, or a slight tendency of cavitation. Such modification should be made such that the area ratio of the pressure receiving sections of the pressure-compensating auxiliary valve on the side of the meter-out circuit is varied slightly, or springs are provided which bias the valve element in addition to the pressure receiving sections, thereby regulating the level of the pressure compensation, making it possible to adjust the flow rate of the return fluid flowing through the meter-out circuit.

Further, the differential pressures such as the LS differential pressure, the VI differential pressure, the VO differential pressure and the like acting upon the auxiliary valve may be such that individual hydraulic pressures are not directly introduced hydraulically, but the differential pressures are detected electrically by differential-pressure meters and their detecting signals are used to control the auxiliary valve.

INDUSTRIAL APPLICABILITY

The hydraulic driving apparatus according to the invention is constructed as described above. Accordingly, even if the hydraulic pump is saturated during combined operation of the hydraulic actuators, the first pressure-compensating control means ensures that the discharged flow rate is distributed to the hydraulic actuators, making it possible to effect the combined operation smoothly. Further, regardless of the cases prior to saturation of the hydraulic pump 1 and after the saturation, the second pressure-compensating control means pressure-compensatingly-controls the discharged flow rate in the meter-out circuit when a negative load acts upon the hydraulic actuators, making it possible to reduce pressure fluctuation in the meter-out circuit, and making it possible to prevent occurrence of cavitation in the meter-in circuit.

What is claimed is:

1. A hydraulic driving apparatus comprising:

at least one hydraulic pump;

a plurality of hydraulic circuits, each hydraulic circuit including a plurality of hydraulic actuators driven by hydraulic fluid discharged from said hydraulic pump, flow control valve means having first main variable restrictor means for controlling the flow rate of the hydraulic fluid supplied from said hydraulic pump to the associated hydraulic actuator and second main variable restrictor means for controlling the flow rate of the return fluid discharged from the hydraulic actuator, and first pressure-compensating control means operative with a compensating differential-pressure target value defined by the differential pressure between the pump discharge pressure and the maximum load pressure, for pressure-compensatingly-controlling the first main variable restrictor means of said flow control valve means;

pump control means, operative in response to differential pressure between the discharge pressure of said hydraulic pump and the maximum load pressure of said plurality of hydraulic actuators, for controlling the discharge rate of said hydraulic pump in such a manner that the pump discharge pressure is raised more than the maximum load pressure by a predetermined value; and second pressure-compensating control means operative with a compensating differential-pressure target value determined by the differential pressure across said first main variable restrictor means, for pressure-compensatingly-controlling the second main variable restrictor means of said flow control valve means.

2. A hydraulic driving apparatus according to claim 1, wherein said first pressure-compensating control means comprises first auxiliary variable restrictor means for pressure-compensatingly controlling the hydraulic fluid flow rate flowing through said first main variable restrictor means, and said first control means for controlling said first auxiliary variable restrictor means in such a manner that said first auxiliary variable restrictor means is operated in a valve opening direction in response to the differential pressure between said pump discharge pressure and the maximum load pressure and that said first auxiliary variable restrictor means is operated in a valve closing direction in response to differential pressure across said first main variable restrictor means, and wherein:

said second pressure-compensating control means comprises second auxiliary variable restrictor means for pressure-compensating-controlling flow rate flowing through said second main variable restrictor means, and second control means for controlling said second auxiliary variable restrictor means in such a manner that said second auxiliary variable restrictor means is operated in a valve opening direction in response to differential pressure across said first main variable restrictor means that said second auxiliary variable restrictor means is operated in a valve closing direction in response to differential pressure across said second main variable restrictor means.

3. A hydraulic driving apparatus according to claim 2, wherein said second control means detects directly the differential pressure across said first main variable restrictor means.

4. A hydraulic driving apparatus according to claim 2, wherein said second control means detects the differential pressure between said pump discharge pressure and the maximum load pressure as the differential pressure across said first main variable restrictor means.

5. A hydraulic driving apparatus according to claim 1, wherein said first pressure-compensating control means comprises third auxiliary variable restrictor means arranged upstream of said first variable restrictor means, and further comprising third control means for controlling said third auxiliary variable restrictor means in such a manner that said third auxiliary variable restrictor means is operated in a valve opening direction in response to the differential pressure between said pump discharge pressure and the maximum load pressure and that said third auxiliary variable restrictor means is operated in a valve closing direction in response to the differential pressure across said first main variable restrictor means, wherein:

said second pressure-compensating control means comprises fourth auxiliary variable restrictor means arranged downstream of said second main variable restrictor means, and fourth control means for controlling said fourth auxiliary variable restrictor means in such a manner that said fourth auxiliary variable restrictor means is operated in a valve opening direction in response to the differential pressure between said pump discharge pressure and the maximum load pressure and that said fourth auxiliary variable restrictor means is operated in a valve closing direction in response to the differential pressure across said second main variable restrictor means.

6. A hydraulic driving apparatus according to claim 5, wherein said fourth control means comprises first and second pressure receiving sections for biasing said fourth auxiliary variable restrictor means in a valve opening direction in response to the differential pressure between said pump discharge pressure and the maximum load pressure, third and fourth pressure receiving sections for biasing said fourth auxiliary variable restrictor means in a valve closing direction in response to the differential pressure across said second main variable restrictor means, a first hydraulic line for introducing inlet pressure of said first main variable restrictor means to said first main pressure receiving section, a second hydraulic line for introducing outlet pressure of said second main variable restrictor means to said second pressure receiving section, a third hydraulic line for introducing outlet pressure of said first main variable restrictor means to said third pressure receiving section, and a fourth hydraulic line for introducing inlet pressure of said second main variable restrictor means to said fourth pressure receiving section.

7. A hydraulic driving apparatus according to claim 5, wherein said fourth control means comprises first and second pressure receiving sections for biasing said fourth auxiliary variable restrictor means in a valve opening direction in response to the differential pressure across said second main variable restrictor means, third and fourth pressure receiving sections for biasing said fourth auxiliary variable restrictor means in a valve closing direction in response to the differential pressure across said second main variable restrictor means, a first hydraulic line for introducing said pump discharge pressure to said first pressure receiving section, a second hydraulic line for introducing outlet pressure of said second main variable restrictor means to said second pressure receiving section, a third hydraulic line for introducing said maximum load pressure to said third pressure receiving section, and a fourth hydraulic line for introducing inlet pressure at said second main variable restrictor means to said fourth pressure receiving section.

8. A hydraulic driving apparatus according to claim 1, in which each of said flow control valve means comprises a first seat valve assembly for controlling the flow rate of the hydraulic fluid supplied from said hydraulic pump to said hydraulic actuators, and a second seat valve assembly for controlling the flow rate of the return fluid discharged from said hydraulic actuators to said tank, each of said first and second seat valve assemblies including a seat-type main valve functioning as said first and second main variable restrictor means, a variable restrictor for varying an opening degree in proportion to an opening degree of said main valve, a back-pressure chamber communicating with an inlet of said main valve through said variable restrictor, a pilot circuit through which said back-pressure chamber communicates with an outlet of said main valve, and a pilot valve arranged in said pilot circuit for controlling operation of said main valve, and in which said first pressure-compensating control means comprises first auxiliary variable restrictor means arranged in the pilot circuit of said first seat valve assembly, and first control means for controlling said first auxiliary variable restrictor means in such a manner that said first auxiliary variable restrictor means is operated in a valve opening direction in response to the differential pressure between said pump discharge pressure and the maximum load pressure and that said first auxiliary variable restrictor means is operated in a valve closing direction in response to the differential pressure across said first main variable restrictor means, wherein:

said second pressure-compensating control means comprises second auxiliary variable restrictor means arranged in the pilot circuit of said second seat valve assembly, and second control means for controlling said second auxiliary variable restrictor means in such a manner that said second auxiliary restrictor means is operated in a valve opening direction in response to the differential pressure between said pump discharge pressure and the maximum load pressure that said second auxiliary variable restrictor means is operated in a valve closing direction in response to the differential pressure across said second main variable restrictor means.

9. A hydraulic driving apparatus according to claim 8, wherein said second auxiliary restrictor means is arranged in said pilot circuit on the side upstream of said pilot valve, and wherein said second control means comprises first and second pressure receiving sections biasing said second auxiliary variable restrictor means in a valve opening direction, third and fourth pressure receiving sections biasing said second auxiliary variable restrictor means in a valve closing direction, a first hydraulic line for introducing said pump discharge pressure to said first pressure receiving section, a second hydraulic line for introducing the outlet pressure of said pilot valve to said second pressure receiving section, a third hydraulic line for introducing said maximum load pressure to said third pressure receiving section, and a fourth hydraulic line for introducing the inlet pressure of said pilot valve to said fourth pressure receiving section.

10. A hydraulic driving apparatus according to claim 8, wherein said second auxiliary variable restrictor means is arranged in said pilot circuit on the side upstream of said pilot valve, and wherein said second control means comprises first and second pressure receiving sections biasing said second auxiliary variable restrictor means in the valve opening direction, third fourth and fifth pressure receiving sections biasing said second auxiliary variable restrictor means in the valve closing direction, a first hydraulic line for introducing said pump discharge pressure to said first pressure receiving section, a second hydraulic line for introducing pressure within said back-pressure chamber to said second pressure receiving section, a third hydraulic line for introducing said maximum load pressure to said third pressure receiving section, a fourth hydraulic line for introducing the inlet pressure of said pilot valve to said fourth pressure receiving section, and a fifth hydraulic line for introducing the inlet pressure of said main valve to said fifth pressure receiving section.

11. A hydraulic driving apparatus according to claim 8, wherein said second auxiliary variable restrictor means is arranged in said pilot circuit on the side downstream of said pilot valve, and wherein said second control means comprises first and second pressure receiving sections biasing said second auxiliary variable restrictor means in the valve opening direction, third and fourth pressure receiving sections biasing second auxiliary variable restrictor means in the valve closing direction, a first hydraulic line for introducing pressure within the back-pressure chamber of said main valve to said first pressure receiving section, a second hydraulic line for introducing said maximum load pressure to said second pressure receiving section, a third hydraulic line for introducing said pump discharge pressure to said third pressure receiving section, and a fourth hydraulic line for introducing the outlet pressure of said pilot valve to said fourth pressure receiving section.

12. A hydraulic driving apparatus according to claim 8, wherein said second auxiliary variable restrictor means is arranged in said pilot circuit on the side downstream of said pilot valve, and wherein said second control means comprises first and second pressure receiving sections biasing said second auxiliary variable restrictor means in the valve opening direction, third, fourth and fifth pressure receiving sections biasing said second auxiliary variable restrictor means in the valve closing direction, a first hydraulic line for introducing said pump discharge pressure to said first pressure receiving section, a second hydraulic line for introducing the outlet pressure of said pilot valve to said second pressure receiving section, a third hydraulic line for introducing said maximum load pressure to said third pressure receiving section, a fourth hydraulic line for introducing the inlet pressure of said main valve to said fourth pressure receiving section, and a fifth hydraulic line for introducing the outlet pressure of said main valve to said fifth pressure receiving section.

13. A hydraulic driving apparatus according to claim 8, wherein:

said second control means controls said second auxiliary variable restrictor means in such a manner that a sum of the flow rate passing through said main valve and the flow rate passing through said pilot valve substantially coincides with the flow rate of said return fluid attendant upon driving of the associated hydraulic actuator.

14. A hydraulic driving apparatus according to claim 9, wherein:

said second control means controls said second auxiliary variable restrictor means in such a manner that a sum of the flow rate passing through said main valve and the flow rate passing through said pilot valve substantially coincides with the flow rate of said return fluid attendant upon driving of the associated hydraulic actuator.

15. A hydraulic driving apparatus according to claim 10, wherein:

said second control means controls said second auxiliary variable restrictor means in such a manner that a sum of the flow rate passing through said main valve and the flow rate passing through said pilot valve substantially coincides with the flow rate of said return fluid attendant upon driving of the associated hydraulic actuator.

16. A hydraulic driving apparatus according to claim 11, wherein:

said second control means controls said second auxiliary variable restrictor means in such a manner that a sum of the flow rate passing through said main valve and the flow rate passing through said pilot valve substantially coincides with the flow rate of said return fluid attendant upon driving of the associated hydraulic actuator.

17. A hydraulic driving apparatus according to claim 12, wherein:

said second control means controls said second auxiliary variable restrictor means in such a manner that a sum of the flow rate passing through said main valve and the flow rate passing through said pilot valve substantially coincides with the flow rate of said return fluid attendant upon driving of the associated hydraulic actuator.

18. A hydraulic driving apparatus according to claim 14, wherein:

a ratio of a pressure receiving area of the pressure receiving section receiving pressure within said back-pressure chamber of said main valve with respect to a pressure receiving area of the pressure receiving section receiving the inlet pressure of said main valve is K, and a multiple of second power of a ratio of a pressure receiving area on an outlet side of the associated hydraulic actuator with respect to a pressure receiving area thereof on an inlet side is $\phi$, and wherein pressure receiving areas of the respective first pressure receiving section, second pressure receiving section, third pressure receiving section and fourth pressure receiving section are set to a ratio of $\phi K:1:\phi K:1$.

19. A hydraulic drive apparatus according to claim 15, wherein:

a ratio of a pressure receiving area of the pressure receiving section receiving pressure within said back-pressure chamber of said main valve with respect to a pressure receiving area of the pressure receiving section receiving the inlet pressure at said main valve is K, and a multiple of second power of a ratio of a pressure receiving area on an outlet side of the associated hydraulic actuator with respect to a pressure receiving area thereof on an inlet side is $\phi$, and wherein pressure receiving areas of the respective first pressure receiving section, second pressure receiving section, third pressure receiving section, fourth pressure receiving section and fifth pressure receiving section are set to a ratio of $\phi K(1-K):1:\phi K(1-K):1-K:K$.

20. A hydraulic driving apparatus according to claim 16, wherein:

a ratio of a pressure receiving area of the pressure receiving section receiving pressure within said back-pressure chamber of said main valve with respect to a pressure receiving area of the pressure receiving section receiving the inlet pressure at said main valve is K, and a multiple of second power of a ratio of a pressure receiving area on an outlet side of the associated hydraulic actuator with respect to a pressure receiving area thereof on an inlet side is $\phi$, and wherein pressure receiving areas of the respective first pressure receiving section, second pressure receiving section, third pressure receiving section and fourth pressure receiving section are set to a ratio of $1:\phi K:\phi K:1$.

21. A hydraulic driving apparatus according to claim 17, wherein:

a ratio of a pressure receiving area of the pressure receiving section receiving pressure within said back-pressure chamber of said main valve with respect to a pressure receiving area of the pressure receiving section receiving the inlet pressure a said main valve is K and a multiple of second power of a ratio of a pressure receiving area on an outlet side of the associated hydraulic actuator with respect to a pressure receiving area thereof on an inlet side is $\phi$, and wherein pressure receiving areas of the respective first pressure receiving section, second pressure receiving section, third pressure receiving section, fourth pressure receiving section and fifth pressure receiving section are set to a ratio of $\phi K:1:\phi K:K:1-K$.

* * * * *